US012774429B2

(12) United States Patent
Johansson et al.

(10) Patent No.: US 12,774,429 B2
(45) Date of Patent: Oct. 27, 2026

(54) PROCESS FOR MAKING A VEGETABLE FAT COMPOSITION WITH AN INCREASED AMOUNT OF SN2 POSITIONED PALMITIC ACID

(71) Applicant: AAK AB (PUBL), Malmö (SE)

(72) Inventors: Martin C. Johansson, Mörrum (SE); Martinus M.M. Vissers, el Bussum (NL)

(73) Assignee: AAK AB (PUBL), Malmö (SE)

( * ) Notice: Subject to any disclaimer, the term of this patent is extended or adjusted under 35 U.S.C. 154(b) by 540 days.

(21) Appl. No.: 18/042,473

(22) PCT Filed: Aug. 26, 2021

(86) PCT No.: PCT/SE2021/050827
§ 371 (c)(1),
(2) Date: Feb. 22, 2023

(87) PCT Pub. No.: WO2022/045951
PCT Pub. Date: Mar. 3, 2022

(65) Prior Publication Data
US 2023/0323245 A1 Oct. 12, 2023

(30) Foreign Application Priority Data
Aug. 31, 2020 (SE) .................................... 2051003-8

(51) Int. Cl.
*C11C 3/08* (2006.01)
*A23D 9/04* (2006.01)
(Continued)

(52) U.S. Cl.
CPC .................. *C11C 3/08* (2013.01); *A23D 9/04* (2013.01); *A23L 33/12* (2016.08); *A23L 33/40* (2016.08);
(Continued)

(58) Field of Classification Search
CPC .......... C11B 3/003; C11B 3/12; A23L 33/115; A23L 33/40; A23D 9/04; C11C 1/045; C11C 1/10; C11C 3/02
(Continued)

(56) References Cited

U.S. PATENT DOCUMENTS 5,658,768 A 8/1997 Quinlan

FOREIGN PATENT DOCUMENTS

CA 3092876 A1 * 9/2019 .............. A23D 9/00
CN 102757988 A 10/2012
(Continued)

OTHER PUBLICATIONS

Deffense, Fractionation of Palm Oil, Journal of the American Oil Chemists' Society 62(2):376-385; Feb. 1985.*
(Continued)

*Primary Examiner* — Brent T O'Hern
(74) *Attorney, Agent, or Firm* — Finnegan, Henderson, Farabow, Garrett & Dunner LLP

(57) ABSTRACT

The invention relates to the production of a triglyceride with Palmitic acid (P) in the middle position (XPX). A first transesterification process is used to produce a vegetable fat composition rich in palmitic acid and said intermediate composition is then further processed to produce triglycerides having a high proportion of its palmitic acid in the middle position.

22 Claims, 1 Drawing Sheet

(51) Int. Cl.
*A23L 33/00* (2016.01)
*A23L 33/12* (2016.01)
*C11C 1/04* (2006.01)
*C11C 1/10* (2006.01)
*C11C 3/10* (2006.01)

(52) U.S. Cl.
CPC ................ *C11C 1/045* (2013.01); *C11C 1/10* (2013.01); *C11C 3/10* (2013.01)

(58) Field of Classification Search
USPC ............................................................ 426/33
See application file for complete search history.

(56) References Cited

FOREIGN PATENT DOCUMENTS

| | | | |
|---|---|---|---|
| CN | 102776077 | A | 11/2012 |
| CN | 106912622 | A | 7/2017 |
| CN | 106916631 | A | 7/2017 |
| CN | 107581615 | A | 1/2018 |
| CN | 108265089 | A | 7/2018 |
| EP | 0 209 327 | A2 | 1/1987 |
| JP | 20008074 | A | 1/2000 |
| JP | 2009507480 | A | 2/2009 |
| JP | 2019183169 | A | 10/2019 |
| JP | 2019214740 | A | 12/2019 |
| WO | WO 2005/036987 | A1 | 4/2005 |
| WO | WO 2011/135564 | A1 | 11/2011 |
| WO | WO 2016/101894 | A1 | 6/2016 |
| WO | WO 2019/054256 | A1 | 3/2019 |

OTHER PUBLICATIONS

Perkin, Palm Oil Analysis Complete Lab Solutions From Upstream to Donstream Solutions (Year: 2004).*
Maduko, Enzymatic Production of Infant Milk Fat Analogs Containing Palmitic Acid: Optimization of Reactions by Response Surface Methodology (Year: 2007).*
Cowan, Enzymatic Interesterification, AOCS (Year: 2019).*
Bar-Yoseph et al. (Year: 2016).*
Ghosh et al., Utilization of High-Melting Palm Stearin in Lipase-Catalyzed Interesterification with Liquid Oils (Year: 1997).*
Romeu-Nadal et al. (2008), Effect of cold storage on vitamins C and E and fatty acids in human milk, Food Chemistry. (Year: 2008).*
Wang, 1,3-Dioleoyl-2-palmitoylglycerol-rich triacylglycerol characterization by three processing methods (2019), International Journal of Food Properties 2019, vol. 22, No. 1, 1156-1171. (Year: 2019).*
Chen et al., "Synthesis of the Structured Lipid 1,3-Dioleoyl-2-palmitoylglycerol from Palm Oil," JAOCS, 81(6) (2004).
International Search Report for PCT/SE2021/050829, mailed Oct. 20, 2021, 8 pages.
Wang et al., "1,3-Dioleoyl-2-palmitoylglycerol-rich triacylglycerol characterization by three processing methods," International Journal of Food Properties, 22(1): 1156-1171 (2019).
Written Opinion of the International Search Authority for PCT/SE2021/050829, mailed Oct. 20, 2021, 9 pages.

* cited by examiner

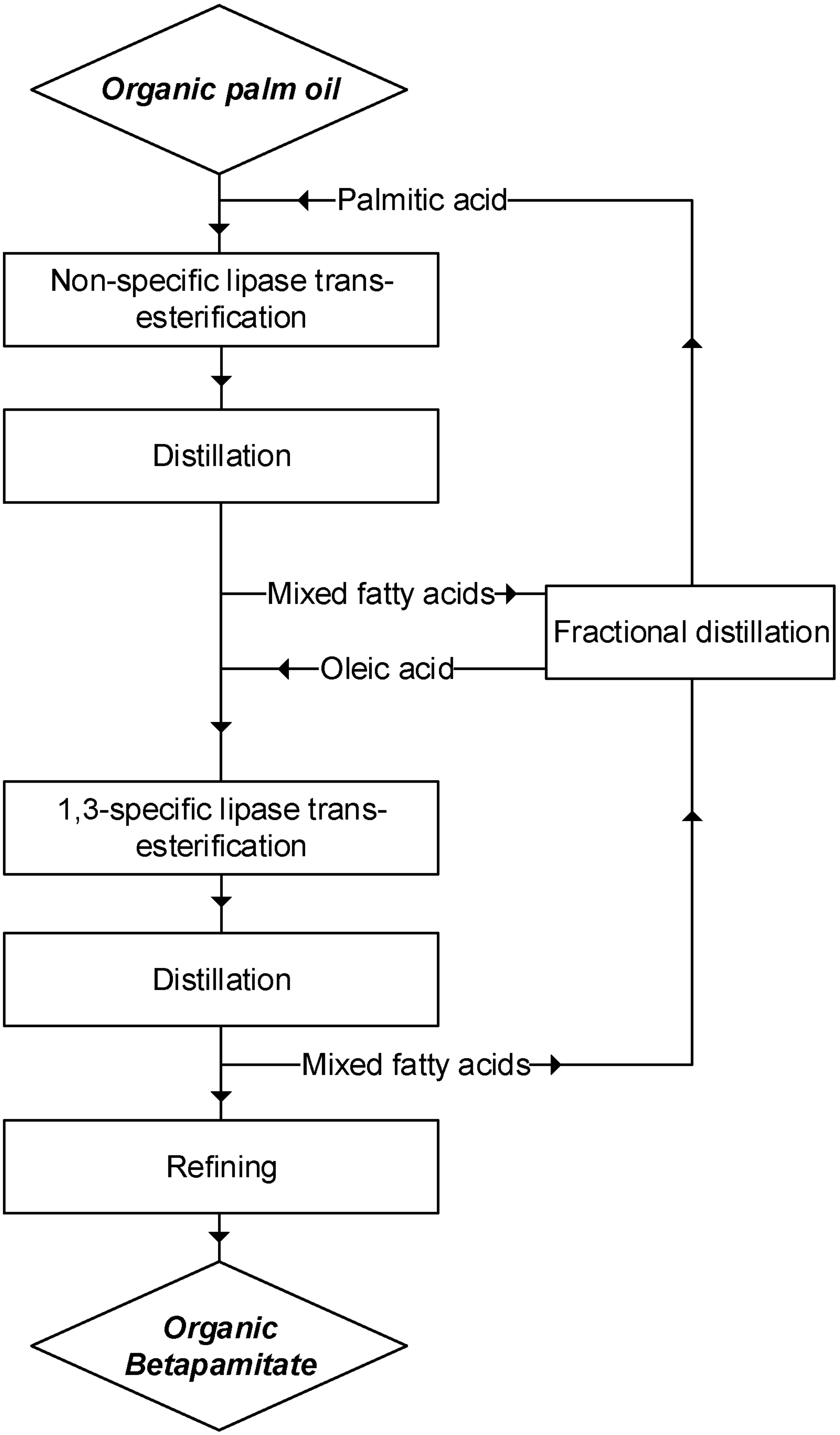
Organic palm oil
Palmitic acid
Non-specific lipase trans-esterification
Distillation
Mixed fatty acids
Fractional distillation
Oleic acid
1,3-specific lipase trans-esterification
Distillation
Mixed fatty acids
Refining
Organic Betapamitate

PROCESS FOR MAKING A VEGETABLE FAT COMPOSITION WITH AN INCREASED AMOUNT OF SN2 POSITIONED PALMITIC ACID

The present application is a national stage entry of PCT/SE2021/050827, filed Aug. 26, 2021, which claims priority to Swedish Application No. 2051003-8, filed Aug. 31, 2020. The entire contents of each application are hereby incorporated by reference.

TECHNICAL FIELD

The invention relates to the production of a triglyceride with Palmitic acid (P) in the middle position (XPX). A first transesterification process is used to produce a vegetable fat composition rich in palmitic acid and said intermediate composition is then further processed to produce triglycerides having a high proportion of its palmitic acid in the middle position.

BACKGROUND ART

The citation and incorporation of patent documents herein is done for convenience only and does not reflect any view of the validity, patentability, and/or enforceability of such patent documents.

It has previously been reported (see e.g. Breckenridge et al., Can. J. Biochem. 1969, 47, 761-769) that in human milk fat stearic acid is not enriched in the sn2 position in contrast to other long chain saturated fatty acids, and only 15% of all stearic acid is located in the sn2 position. This has been confirmed in several studies such as the one from Sun et al., 2018 (Sun et al., Food Chemistry 2018, 242, 29-36) where they show that all long chain (C14 and above) saturated fatty acids except stearic acid are enriched in sn2 (see e.g. Sun et al 2018 Table 4). This means that stearic acid is located in the sn2 position to a lower degree than by random distribution (which would equal to 33%) whereas other long chain fatty acids are located in the sn2 position to a higher degree than a purely random distribution.

Many studies have been done within the field trying to solve the problem of improving the absorption of these fatty acids, especially the most abundant, namely palmitic acid. When these fatty acids are supplied in the 1,3 position, insoluble calcium soaps are formed, which correlates to the risk of losing fat and calcium via the stool. Clinical evidence hypothesize that the palmitic acid in the sn2 position in infant formula has effects on numerous parameters. Even though high sn2-palmitate (beta-palmitate) formula have shown clinical benefits on fat and calcium absorption, softer stools, bone strength parameters, faecal bacteria, and reduced crying in infants there still remain differences of infant formulas versus breast feeding (Miles and Calder, Nutrition Research 2017, 44, 1-8).

The reason why stearic acid is not enriched in the sn2 position in human milk fat similar to the other long chain saturated fatty acids is not known, however, this enrichment is not random and it is suspected that it fulfils a certain physiological need in the infant. This is further hypothesized by the fact that it has been preserved during evolution. Even if the exact physiological effect is not known, it is important that oils and fats used in products substituting human milk have a high degree of resemblance to human milk fat. This is not only true for the used fatty acid composition but also positioning of said fatty acids within the triglycerides.

Breckenridge reported that 6.7% of the total fatty acids in human milk are stearic acid, and more recent reports show somewhat lower levels in Asian populations, 5.58% with a range of 3.90 to 6.79 was reported by Hagerman et al. 2019 (Hagerman et al., International Dairy Journal, 2019, 92, 37-49).

Given the striking difference in how stearic acid is positioned in human milk fat compared to other long chain saturated fatty acids, it is further important that the positioning of stearic acid be considered in fats enriched with palmitate in sn2, where the composition is intended for use in human milk fat replacers.

It has previously been disclosed that beta-palmitate based on reaction of palm stearin compositions comprises 9.6% stearic acid out of the total fatty acids of which 45.1% is located in the sn2 position (see e.g. Lee et al., New Biotechnology, 2010, 27, 38-45). This is higher than in human milk fat in both total and proportion of stearic acid in sn2. U.S. Pat. No. 5,658,768 reports values of 5% or lower of the total stearic acid being in sn2-position with low levels of total stearic acid. This is lower than human milk fat in both total amount and relative proportion in sn2.

Additionally, if a starting material of limited supply, like e.g. organic palm oil, is used it is desirable to utilize as much of the palmitic acid in the starting material as possible. Thus, there is a need for limiting the amount of palmitic acid wasted during a process for production of a composition with high sn2 palmitate fats. A high palmitic acid yield is even more important for non-palm based products.

Further, there remains a need for high sn2 palmitate fats, which are to be used in blends of fats intended as human milk fat replacers. Even further, there remains a need where the relative positioning of stearic acid in the sn2 position is comparable to that in human milk fat or only slightly higher in such high sn2 palmitate fats.

It is hence the main object of the present invention to provide a process utilizing a high yield of palmitic acid from starting oil to product to obtain a high sn2 palmitate fat composition. It is a further object, to provide said process in a way to obtain an organic certified product.

Another object of the present invention is to provide a high sn2 palmitate fat having the relative positioning of stearic acid in the sn2 position being comparable to that in human milk fat.

SUMMARY

The invention relates to the production of triglycerides with palmitic acid (P; C16:0) in the middle position (also sometimes referred to as XPX or OPO). A transesterification process is used to produce an intermediate vegetable fat composition rich in palmitic acid and this composition is then further processed to produce the much needed triglycerides having a high proportion of palmitic acid in the middle position, which is highly important in e.g. infant nutrition. By the present invention is provided a circular, solvent free process, starting from e.g. palm oil or fraction hereof and ending with an XPX-product. The process can be run basically without other raw materials being added during the process as the leftover palmitic acid in a palmitic acid rich fraction is reused in the process.

The present invention hereby provides a process utilizing a high yield of palmitic acid from starting oil to product to obtain a high sn2 palmitate fat composition, hereby addressing the need of more raw material efficient process for producing infant formula fats with high content of palmitic acid in the sn2 position.

One of the advantages of re-use is that as a limited supply of organic palm oil is present it is a scarce material with a high price, hence the present invention provides a process which efficiently utilise the amount of starting material, hereby taking the limited supply and price into account.

Disclosed herein in a first aspect is a process for making a final vegetable fat composition with palmitic acid increased in the sn2 position compared to a starting vegetable fat composition, the process comprising the following steps:

a. mixing a starting vegetable fat composition with a first fatty acid mixture to obtain a first process mixture, wherein the starting vegetable fat composition comprises between 15% and 75% by weight of palmitic acid in the triglycerides compared to the total weight of fatty acids in the triglycerides in the starting vegetable fat composition and the first fatty acid mixture comprises at least 75% by weight of palmitic acid (C16:0) and/or non-glyceride esters thereof compared to the total weight of fatty acids and non-glyceride esters thereof in the first fatty acid mixture;

b. performing a first transesterification process to the first process mixture to obtain a first transesterified mixture comprising a mixture of free fatty acids and/or non-glyceride esters thereof and transesterified triglycerides;

c. separating the free fatty acids and/or non-glyceride esters thereof from the transesterified triglycerides of the first transesterified mixture to obtain an intermediate vegetable fat composition and a first mixture of excess free fatty acids and/or non-glyceride esters thereof;

d. mixing the intermediate vegetable fat composition with a second fatty acid mixture to obtain a second process mixture, wherein the second fatty acid mixture comprises 10% or less by weight of palmitic acid and/or non-glyceride esters thereof compared to the total weight of fatty acids and non-glyceride esters thereof in the second fatty acid mixture;

e. performing a second transesterification process to the second process mixture by use of one or more 1,3-specific lipases to obtain a second transesterified mixture comprising a mixture of free fatty acids and/or non-glyceride esters thereof and transesterified triglycerides;

f. separating the free fatty acids and/or non-glyceride esters thereof from the transesterified triglycerides of the second transesterified mixture to obtain the final vegetable fat composition with palmitic acid increased in the sn2 position compared to the starting vegetable fat composition and a second mixture of excess free fatty acids and/or non-glyceride esters thereof;

g. fractionating the first mixture of excess free fatty acids and/or non-glyceride esters thereof to obtain at least a first palmitic acid rich fraction and a first palmitic acid sparse fraction, wherein the first palmitic acid rich fraction comprises at least 75% by weight of palmitic acid and/or non-glyceride esters thereof compared to the total weight of fatty acids and non-glyceride esters thereof in the first palmitic acid rich fraction and the first palmitic acid sparse fraction preferably comprises 15% or less, such as 10% or less by weight of palmitic acid and/or non-glyceride esters thereof compared to the total weight of fatty acids and non-glyceride esters thereof in the first palmitic acid sparse fraction;

h. fractionating the second mixture of excess free fatty acids and/or non-glyceride esters thereof to obtain at least a second palmitic acid rich fraction and a second palmitic acid sparse fraction, wherein the second palmitic acid rich fraction comprises at least 75% by weight of palmitic acid and/or non-glyceride esters thereof compared to the total weight of fatty acids and non-glyceride esters thereof in the second palmitic acid rich fraction and the second palmitic acid sparse fraction preferably comprises 15% or less, such as 10% or less by weight of palmitic acid and/or non-glyceride esters thereof compared to the total weight of fatty acids and non-glyceride esters thereof in the second palmitic acid sparse fraction;

i. using at least the first and second palmitic acid rich fractions as at least a part of the first fatty acid mixture in a subsequent process restarting from step a with a new amount of starting vegetable fat composition.

By a new amount of starting vegetable fat composition is meant that the process can be run as either a batch-wise process or as a continuous process, meaning that the new amount of starting material can be supplied either as a batch or in a continuous stream.

An increased sn2 positioned palmitic acid compared to a starting vegetable fat composition means that the content of palmitic acid in the triglycerides in the sn2 position (the mid position on the triglyceride) of the final vegetable fat composition is increased if compared to the content of palmitic acid in the same position in the starting vegetable fat composition. This means that by comparing the amount of palmitic acid found in the sn2 position of the starting vegetable fat composition with the amount of palmitic acid found in the sn2 position of the final vegetable fat composition, this amount is higher in the final vegetable fat composition.

The term "amount" in this regard means both the relative amount and the absolute amount. The triglycerides are analysed in regard to the fatty acid composition on the sn2 position to determine the absolute amount of triglycerides with a palmitic acid in the sn2 position. The relative amount is the fraction of all palmitic acids in the triglycerides that are positioned in the sn2 position. The relative amount is obtained by dividing the percentage of palmitic acid in the sn2 position, the absolute amount, with the percentage of palmitic acid on all positions of the triglycerides and further divide with 3 in order to take the 3 positions into account. It is both the relative and the absolute amount of palmitic acid in the sn2 position that are higher in the final vegetable fat composition compared to the starting vegetable fat composition.

Previous teachings has shown that in order to create a vegetable fat with a high content of palmitic acid in sn2 position, the starting material for a process should be selected from an as hard as possible palm stearin, as this equals to more palmitic acid in the starting composition, especially more sn2 palmitic acid. Contrary to this, the present invention is able to start from other starting materials, such as e.g., palm oil or even palm olein, and still create a balanced process to create a vegetable fat composition useful as a human milk fat substitute with a high content of palmitic acid in the sn2 position.

The first transesterification step (step b. in the process) will increase the content of palmitic acid in the triglycerides compared to the content of palmitic acid in the starting vegetable fat composition. The transesterification is especially increasing the amount of palmitic acid in the sn2 position of the triglycerides. In naturally occurring vegetable fat composition palmitic acid is a sparse source, especially triglycerides comprising palmitic acid in the sn2 position.

The second transesterification step (step d. in the process) is using a 1,3-specific lipase (i.e. sn1 and sn3 position specific lipase). Together with a fatty acid mixture low in palmitic acid residues this will decrease the content of palmitic acid in the outer positions of the triglycerides compared to the intermediate vegetable fat composition consequently increasing the proportion of palmitic acid in the sn2 position in relation to the total content of palmitic acid in the triglycerides. Hence, by using both steps a high yield of XPX-product per unit of starting oil, e.g. palm oil, is obtained, especially if compared to previous teachings starting from palm oil stearin. Starting from a palm oil, a yield of approximately 20% palm stearin can be expected in a first dry fractionation (see e.g. table 9 of M. Kellens et al. Eur. J. Lipid Sci. Technol. 109 (2007) 336-349). When refractionating such a stearin to obtain a low iodine value palm stearin with high levels of palmitic acid in the sn2 position further olein is created, and the overall yield from palm oil to a double fractionated palm stearin is well below 10%.

By recovering the excess free fatty acid mixtures and fractionating at least one of these mixtures into two fractions the palmitic acid not included in the final product can be reused in the same process starting from a new amount of starting vegetable fat composition, hereby obtaining a new amount of final vegetable fat composition. This means that as palmitic acid is found as a limiting source in nature, the present process secures that the amount of palmitic acid wasted during the process is minimal, as it keeps reusing the excess palmitic acid back into a new process starting from step a.

The at least two fractions obtained are one high in palmitic acid and one low in palmitic acid, where the fraction containing the high amount of palmitic acid is reused as the first fatty acid mixture in step a, and the fraction containing the low amount of palmitic acid may be used as the second fatty acid mixture in step d. This means that there is no need to have a splitting unit to produce fatty acids and glycerol. Further, there is no need for glycerol purification (compared to e.g. a process starting from PPP). Splitting has previously been necessary in the standard process of prior teachings as the oleic fatty acid stems from a splitted oil. By the present invention only some fatty acids are needed to start up the process but once up and running no addition of free fatty acids or their esters are needed as the free fatty acids in "excess" after the two steps can be recycled back into the process. Even further, there is no need for fractionation of vegetable oil, such as fractionation to palm stearin with low yields, as separation of fatty acids is much more efficient due to the fact that the fatty acids are not joined together three and three but prevail as separate molecules. The fractionation of the fatty acids can e.g. be via crystallisation, distillation, or other means, where fractional distillation is preferred. Fractionation is herein defined at separation into at least two fractionations, which could be performed by any separation method known in the art.

Fractionating to obtain the first palmitic acid rich fraction and the first palmitic acid sparse fraction is not limited to said fractionating step being performed in a one-step process. This means that e.g. a poor yield but fast fractionation is performed and then said fractions are further fractionated to obtain either the rich or sparse fraction depending on the first step, or what fraction is further fractionated. The invention envisions at least to obtain a rich and spare fraction, wherein at least the rich fraction is reused By a new amount of final vegetable fat composition is meant in a similar way as with the starting material that the process can be run as either a batch-wise process or as a continuous process, meaning that the new amount of final product can be obtained from the process either as a batch or in a continuous stream.

The product of the invention is intended to be blended with other oils in order meet the requirements of a human milk fat replacer. These other oils and fats are mainly vegetable oils but oils of other origin such as those derived from animals or microorganisms such as fish oil, long chain polyunsaturated fatty acids (LCPUFA) from microbial sources, milk fat from non-human mammals are also possible to use.

Depending on the starting vegetable fat composition, the product obtained is not only non-trans, but also non-hydrogenated, which is preferred. It is very difficult to change the proportion of 18:0 to 16:0 in vegetable fat compositions with fractionation and interesterification also does not changes this, neither chemically or enzymatically, being it 1,3, or non-positional specific. Hydrogenation on the other hand do increase the content of 18:0. However, trans-fatty acids should be avoided in infant formula products and even though it is possible to do blends with one part native palm oil fraction and one smaller part of fully hydrogenated starting oil it is preferred that the starting oil is not only non-trans, but also non hydrogenated, especially when used for infant formulas.

A further advantage of the present invention is that besides the enrichment of palmitic acid in the sn2 position, the process also allows stearic acid to be distributed in the triglycerides in a similar fashion as in human milk. Further, by choosing the right process parameters, the process is suitable for producing an organic certified product, if starting from an organic certified vegetable fat composition.

Disclosed herein in a second aspect is a vegetable fat composition having palmitic acid present in the sn2 position manufactured according to the first aspect.

Disclosed herein in a third aspect is a processed vegetable fat composition of vegetable origin for use in a blend with other fat compositions for an infant formula, wherein the processed vegetable fat composition comprises at least 30% by weight of palmitic acid in the triglycerides compared to the total weight of fatty acids in the triglycerides and the proportion of palmitic acid in the sn2 position out of total palmitic acid in the triglycerides is at least 50%.

Disclosed herein in a fourth aspect is the use of a vegetable fat composition having palmitic acid present in the sn2 position according to the second aspect or a processed vegetable fat composition according the third aspect in the manufacture of an infant formula.

Disclosed herein in a fifth aspect is the use of a vegetable fat composition having palmitic acid present in the sn2 position according to the second aspect or a processed vegetable fat composition according the third aspect in the manufacture of a plant based food product, such as milk free infant food products. A plant based food product is intended to mean a food product based mainly on components of vegetable origin. Minor components of non-vegetable origin is allowed to be present. In one embodiment the plant based food product is made entirely of components having vegetable origin and thus comprises no components of animal origin. An example of a plant based food product is milk free infant food products.

Disclosed herein in a sixth aspect is an infant formula comprising between 15% to 100% by weight, such as 15% to 99% by weight of a vegetable fat composition having palmitic acid present in the sn2 position according to the second aspect or a processed vegetable fat composition according the third aspect compared to the total amount of fat composition in said infant formula.

Definitions

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

As used herein, the term "vegetable" shall be understood as originating from a plant or a single cell organism. Thus, vegetable fat or vegetable triglycerides are still to be understood as vegetable fat or vegetable triglycerides if all the fatty acids used to obtain said triglyceride or fat is of plant or single cell organism origin.

Saturated fatty acids are chains of carbon atoms joined by single bonds, with the maximum number of hydrogen atoms attached to each carbon atom in the chain. Unsaturated fatty acids are chains of carbon atoms joined by single bonds and varying numbers of double bonds, which do not have their full quota of hydrogen atoms attached. An unsaturated acid can exist in two forms, the cis form and the trans form. A double bond may exhibit one of two possible configurations: trans or cis. In trans configuration (a trans fatty acid), the carbon chain extends from opposite sides of the double bond, whereas, in cis configuration (a cis fatty acid), the carbon chain extends from the same side of the double bond. The trans fatty acid is a straighter molecule. The cis fatty acid is a bent molecule.

By using the nomenclature CX means that the fatty acid comprises X carbon atoms, e.g. a C16 fatty acid has 16 carbon atoms while a C18 fatty acid has 18 carbon atoms. However, C48, C50, C52, and C54, as disclosed in the examples means a triglycerides where the sum of carbons in the three fatty acids is 48, 50, 52, and 54, respectively.

By using the nomenclature CX:Y means that the fatty acid comprises X carbon atoms and Y double bonds, e.g. a C16:0 fatty acid has 16 carbon atoms and 0 double bonds while a C18:1 fatty acid has 18 carbon atoms and 1 double bond.

A triglyceride XPX means a triglyceride with palmitic acid, P, in the sn2 position and any fatty acid in the sn1 and sn3 positions. PPP means tripalmitin.

As used herein, "%" or "percentage" relates to weight percentage i.e. wt. % or wt.-% if nothing else is indicated.

As used herein, "vegetable oil" and "vegetable fat" are used interchangeably, unless otherwise specified.

As used herein the term "single cell oil" shall mean oil from oleaginous microorganisms which are species of yeasts, molds (fungal), bacteria and microalgae. These single cell oils are produced intracellular and in most cases during the stationary growth phase under specific growth conditions (e.g. under nitrogen limitation with simultaneous excess of a carbon source). Examples of oleaginous microorganisms are, but not limited to, *Mortierella* alpineea, *Yarrowia lipolytica*, Schizochytrium, *Nannochloropsis, Chlorella, Crypthecodinium cohnii, Shewanella.*

The term "comprising" or "to comprise" is to be interpreted as specifying the presence of the stated parts, steps, features, or components, but does not exclude the presence of one of more additional parts, steps, features, or components.

As used herein, the term "and/or" is intended to mean the combined ("and") and the exclusive ("or") use, i.e. "A and/or B" is intended to mean "A alone, or B alone, or A and B together".

As used herein triglyceride compositions, oils, or fats denotes the same thing, and it is to be understood that other acylglycerols such as mono- and diglyceride generally are present but the majority of said compositions are triglycerides. This also means that when a fatty acid in a composition is defined by the % by weight of said fatty acid in the triglycerides compared to the total weight of fatty acids in the triglycerides in a vegetable fat composition, the amount of fatty acids in mono- and diglycerides are also comprised in said number. The % by weight of said fatty acid in the triglycerides compared to the total weight of fatty acids in the triglycerides in a vegetable fat composition is calculated as the % of said fatty acid on a glycerol backbone compared to all fatty acids on a glycerol backbone. This also means that the term "triglyceride composition" includes mono and diglycerides. Furthermore, it is to be understood that the terms triglycerides, triglyceride compositions, oils, or fats may contain small amounts of free fatty acids e.g. if not fully refined, partially hydrolysed or if distillative separation is not fully completed.

BRIEF DESCRIPTION OF THE DRAWINGS

FIG. 1 shows a flowchart illustratively showing one embodiment of the process of the present invention.

DETAILED DESCRIPTION

The description herein of any aspect or embodiment of the invention using terms such as "comprising", "having," "including," or "containing" with reference to an element or elements is intended to provide support for a similar aspect or embodiment of the invention that "consists of", "consists essentially of", or "substantially comprises" that particular element or elements, unless otherwise stated or clearly contradicted by context, e.g. a composition described herein as comprising a particular element should be understood as also describing a composition consisting of that element, unless otherwise stated or clearly contradicted by context. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The present invention relates to a process for making a final vegetable fat composition with palmitic acid increased in the sn2 position compared to a starting vegetable fat composition, a vegetable fat composition having palmitic acid present in the sn2 position and a processed vegetable fat composition of vegetable origin for use in a blend with other fat compositions for an infant formula.

In general, triglycerides use a "sn" notation, which stands for stereospecific numbering. In a Fischer projection of a natural L-glycerol derivative, the secondary hydroxyl group is shown to the left of C-2; the carbon atom above this then becomes C-1 and that below becomes C-3. The prefix 'sn' is placed before the stem name of the compound.

Sn1/Sn2/Sn3:

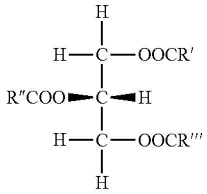

position sn-1 position sn-2 position sn-3

Fischer projection of a natural L-glycerol derivative.

In one or more embodiments, the process further comprises the step of using the first palmitic acid sparse fraction as at least a part of the second fatty acid mixture in a subsequent process restarting from step a with a new amount of starting vegetable fat composition and/or using the second palmitic acid sparse fraction as at least a part of the second fatty acid mixture in a subsequent process restarting from step a with a new amount of starting vegetable fat composition.

In one or more embodiments, the first mixture of excess free fatty acids and/or non-glyceride esters thereof and the second mixture of excess free fatty acids and/or non-glyceride esters thereof is combined into one mixture prior to fractionating the mixture into at least a palmitic acid rich fraction and a palmitic acid sparse fraction.

In one or more embodiments, the process further comprises the step of refining the final vegetable fat composition, such as by deodorization, bleaching, neutralization, and/or filtering.

In one or more embodiments, the process further comprises at least one step to reduce partial acylglycerols, wherein the at least one step is one or more of the steps selected from the group consisting of:

- having molecular sieves or other water adsorbents or absorbents present in or in parts of the first and/or second transesterification process;
- treatment with lipase with specificity for partial acylglycerols
- removing water during or after the first transesterification process and/or the second transesterification process by partial vacuum or nitrogen gas bubbling;
- performing an esterification process after the first transesterification process and/or the second transesterification process by using a lipase and conditions promoting esterification;
- performing an esterification process after the first transesterification process and/or the second transesterification process with elevated temperature and reduced pressure to remove the water formed in esterification.

A lipase with specificity for partial acylglycerols could e.g. be a Lipase G from Amano, which is a lipase stemming from *Penicillium camemberti* that is specific for partial acylglycerols.

In one or more embodiments, one or more of the separating steps are performed by a distillation and/or a neutralization process on the process mixture after the transesterification process is performed to separate the free fatty acids and/or non-glyceride esters thereof from the transesterified triglycerides. In one or more embodiments, all of the separating steps are performed by a distillation and/or a neutralization process on the process mixture after the transesterification process is completed to separate the free fatty acids and/or non-glyceride esters thereof from the transesterified triglycerides.

In one or more embodiments, the second transesterification process is performed by adding the one or more 1,3-specific lipases to the second process mixture or by transferring the second process mixture through one or several columns comprising one or more 1,3-specific lipases. This can be performed either batch-wise by stirring a tank comprising oil and lipase on a carrier (immobilised lipase), or it could be performed as a continuous process by using a column with immobilised lipases that is retained in the column whereas the oil is pumped through. This way of performing the step can also be used for the first transesterification as well depending on the type of lipase used in that step. Each of the transesterifications can also be performed more than once. Instead of adding a large excess of the fatty acid mixtures in step a and d, respectively, steps a to c and/or d to f, respectively, are undertaken two or more times in the same cycle starting from step a and ending with step i. In one or more embodiments, the steps d to f are performed twice or more so that after step f a new amount of the second fatty acid mixture is added and transesterified with the triglycerides obtained from step f, followed by new separation. The same applies to steps a to c.

In one or more embodiments, the first transesterification process is performed at a temperature between 40° C. and 75° C., such as between 50° C. and 75° C., such as between 50° C. and 70° C., such as between 60° C. and 75° C., or such as between 60° C. and 70° C. In one or more embodiments, the second transesterification process is performed at a temperature between 40° C. and 75° C., such as between 50° C. and 75° C., such as between 50° C. and 70° C., such as between 60° C. and 75° C., or such as between 60° C. and 70° C.

The 1,3-specific transesterification is typically performed at 40 to 60° C., with varying times, flow rates, intensity of treatment, as different enzymes will have very different activities, however the degree of interesterification is in one embodiment above 70%, preferably above 80%, such as between 90% to 99%. The definition of the degree of interesterification is the ratio of the content in sn1,3 position to the content in the free fatty acids (or non-glyceride esters) of the most abundant fatty acid in fatty acid mixture (if more of the fatty acid is in 1,3 from the start the ratio is to be reversed).

In one or more embodiments, the starting vegetable fat composition is partially or fully hydrolysed before or when mixing the starting vegetable fat composition with the first fatty acid mixture, and wherein the hydrolysed fatty acids of the starting vegetable fat composition are not separated from the hydrolysed mixture before mixing with the first fatty acid mixture. When partially hydrolysed, preferably at least 10%, such as at least 15%, or at least 20%, or most preferably at least 30% of monoglycerides and diglycerides are present.

In one or more embodiments, the weight ratio of the first fatty acid mixture to the starting vegetable oil composition is between 0.5 and 5.0, such as between 1.0 and 3.0, or such as between 2.0 and 2.5. In one or more embodiments, the weight ratio of the second fatty acid mixture to the intermediate vegetable fat composition is between 0.5 and 5.0, such as between 1.0 and 3.0, or such as between 2.0 and 2.5.

In one or more embodiments, no catalyst is used in the first transesterification process. In one or more embodiments, the first transesterification step is performed by a transesterification process by adding one or more lipases to the first process mixture. In one or more embodiments, the one or more lipases used in the first transesterification step has little or no 1,3-positional specificity.

With little or no 1,3-positional specificity is meant a lipase which does not selectively exchange the fatty acids in the sn1 and sn3 (the two outer) positions on the triglyceride, however, some specificity might be obtained but a lipase with little or no 1,3-positional specificity should preferably complete randomly exchange fatty acids in any position.

In one or more embodiments, the one or more lipase enzymes used in the first transesterification step is one or more 1,3-position specific lipases, and wherein the 1,3-position specificity is counteracted by means of adding one or more diacylglycerol isomerizing compounds to the first process mixture. In one or more embodiments, the diacylglycerol isomerizing compound is silica gel.

1,3-specific lipases can generate 1,2 (and 2,3)-diacylglycerols, but these diacylglycerols are not stable and tend to isomerise to give mixtures of 1,2 (2,3) and 1,3-diacylglycerols, where the latter is the most abundant. The rate of isomerisation is affected by factors such as temperature and availability of acidic or basic groups at the enzyme support. The 1,3-specific lipase is then capable of exchanging the fatty acid originally located in the sn2 position as it is located in sn1 or sn3 position after isomerisation to 1,3-diacylglycerols. Surprisingly, we have found that even when using a 1,3-specific lipase immobilised on a support that was found not to promote isomerisation, i.e. it retains the 1,3-specificity of the lipase in the immobilised enzyme preparation, a high degree of randomisation in the first transesterification reaction was achieved. Various conditions were found to give high levels of diacylglycerols and high rate of isomerisation during transesterification thus enabling a 1,3-specific lipase preparation to be used in the first transesterification reaction. These conditions are achieved by:

addition of water beyond the small amount needed to make sure the lipase is active gives high levels of diglycerides as it drives hydrolysis of triglycerides; and/or addition of acyl migration promoting agents with acidic or basic groups on the surface, such as silica, ion exchange resins, celite or zeolites; and/or heating the process mixture in the absence of the lipase to a temperature above maximum operative temperature of the lipase and continue the transesterification once the heated process mixture is brought back into contact with the lipase.

The position specificity of the lipase may also be counteracted by means of a diacylglycerol isomerizing process, said process including during the transesterification step that the mixture is heated without the presence of the lipase so more 1,3-diacylglycerols are formed followed by either refluxing the heated reaction mixture back to the original process mixture or by letting the process mixture go through one or more reactors with heating in between.

In one or more embodiments, no chemical catalyst is used in any step of the process.

In one or more embodiments, any enzyme used is a non-genetically modified enzyme or a non-genetically modified produced enzyme.

A non-genetically modified produced lipase enzyme is a lipase enzyme which is produced without using genetically modified organism (GMO) techniques.

In one or more embodiments, no organic solvents are used in any step of the process.

A process not using a chemical catalyst and a non-GMO produced lipase and further where no organic solvent is used in any of the step should help the final vegetable fat composition to be produced under the organic rules and regulations hereby organically certify the final product if also starting from an organically certified starting composition. Further, the final vegetable fat composition should also fulfil the standards under the National Food Safety Standard, e.g. the National Food Safety Standard Food Nutritional Fortification Substance 1,3-Dioleoyl-2-Palmitoyl Triglyceride—GB 30604-2015.

In one or more embodiments, the first fatty acid mixture comprises at least 80% by weight of palmitic acid and/or non-glyceride esters thereof compared to the total weight of fatty acids and non-glyceride esters thereof in the first fatty acid mixture, such as at least 85%, such as at least 90%, or such as at least 95% by weight of palmitic acid and/or non-glyceride esters thereof compared to the total weight of fatty acids and non-glyceride esters thereof in the first fatty acid mixture.

In one or more embodiments, the first fatty acid mixture comprises 15% or less by weight of stearic acid (C18:0) and/or non-glyceride esters thereof compared to the total weight of fatty acids and non-glyceride esters thereof in the first fatty acid mixture, such as 10% or less, or such as 5% or less.

In one or more embodiments, the starting vegetable fat composition comprises between 20% and 70% by weight of palmitic acid in the triglycerides compared to the total weight of fatty acids in the triglycerides in the starting vegetable fat composition, such as between 25% and 65%, such as between 30% and 60%, such as between 35% and 55%, such as between 40% and 50%, or such as 45% by weight of palmitic acid in the triglycerides compared to the total weight of fatty acids in the triglycerides in the starting vegetable fat composition.

In one or more embodiments, the starting vegetable fat composition is selected from a palm oil or fraction such as palm olein oil or single stage dry fractionated palm stearin or derivative thereof, rice bran oil, peanut oil, cotton seed oil, or combinations hereof. In one or more embodiments, the starting vegetable fat composition is selected from a palm oil or fraction or derivative thereof, palm olein oil, or combinations hereof. Alternatively, the starting vegetable fat composition could be a non-palm product, or a mixture of a non-palm product and a palm product. In one or more embodiments, the starting vegetable oil composition is selected from blends with other oils, such as a mixture of palm oil/fraction and another liquid oil such as but not limited to sunflower, rapeseed, safflower, soybean, or combinations hereof including high oleic versions thereof. E.g. creating a mixture of palm oil and another liquid oil in a fully circular/integrated process in order to get the fatty acid composition of the final product to a desired level is part of the invention.

In one or more embodiments, the starting vegetable fat composition has an iodine value (IV) of at least 15, such as at least 20, such as at least 25, such as at least 30, such as at least 35, such as at least 40, such as at least 45, such as at least 50, such as at least 55, or such as at least 60. In one or more embodiments, the starting vegetable fat composition has an IV of at least 50, such as at least 56.

In one or more embodiments, the first mixture of excess free fatty acids and/or non-glyceride esters thereof comprises at least 90% by weight of the free fatty acids and/or non-glyceride esters thereof compared to the combined total amount of the free fatty acids and/or non-glyceride esters thereof in the first mixture of excess free fatty acids and/or non-glyceride esters thereof and the intermediate vegetable fat composition, such as at least 95%, or such as at least 98%.

By the first mixture of excess free fatty acids and/or non-glyceride esters thereof comprises at least 90% by weight of the free fatty acids and/or non-glyceride esters thereof compared to the combined total amount of the free fatty acids and/or non-glyceride esters thereof in the first mixture of excess free fatty acids and/or non-glyceride esters thereof and the intermediate vegetable fat composition is meant that the excess mixture of free fatty acids and/or non-glyceride esters thereof has at least 90% of the free fatty acids which are remaining in the (combined) excess mixture and intermediate vegetable fat composition after the trans-esterification process. The excess mixture is the obtained mixture after the first transesterification process and after the separation of said process into the excess mixture and the intermediate composition, and the comparing value is the total amount of free fatty acids in both the mixture and the composition.

One of the technical effects of having at least 90% of the free fatty acids recovered in the excess mixture is that the efficiency of the process is increased as more palmitic acid on the free fatty acid form can be removed from the intermediate composition and hereby also being in a larger quantity in the palmitic acid rich fraction after fractionating, which will result in larger amounts of palmitic acid being a part of the first fatty acid mixture in a subsequent process.

In other words, at least 90% of the remaining amount of excess free fatty acids found in the first transesterified mixture after having performed the first transesterification process is separated into the first mixture of excess free fatty acids when separating the first transesterified mixture to obtain an intermediate vegetable fat composition and a first mixture of excess free fatty acids and/or non-glyceride esters thereof.

In one or more embodiments, the intermediate vegetable fat composition comprises at least 50% by weight of palmitic acid in the triglycerides compared to the total weight of fatty acids in the triglycerides in the intermediate vegetable fat, such as at least 60%, such as at least 70%, or such as at least 80% by weight of palmitic acid in the triglycerides compared to the total weight of fatty acids in the triglycerides in the intermediate vegetable fat. In one or more embodiments, the intermediate vegetable fat composition comprises between 50% and 85% by weight of palmitic acid in the triglycerides compared to the total weight of fatty acids in the triglycerides in the intermediate vegetable fat, such as between 60% and 85%, such as between 70% and 85%, such as between 70% and 80%, or such as between 75% and 80% by weight of palmitic acid in the triglycerides compared to the total weight of fatty acids in the triglycerides in the intermediate vegetable fat.

In one or more embodiments, the proportion of palmitic acid in the sn2 position out of total palmitic acid in the triglycerides of the intermediate vegetable fat composition is at least 25%, such as at least 27%, such as at least 29%, such as at least 30%, such as at least 31%, such as at least 32%, or such as substantially 33%.

In one or more embodiments, the second fatty acid mixture comprises at least 4% by weight of stearic acid and/or non-glyceride esters thereof compared to the total weight of fatty acids and non-glyceride esters thereof in the second fatty acid mixture, such as at least 5%, or such as at least 6%.

In one or more embodiments, the second fatty acid mixture comprises at least 60% by weight of C18 fatty acids and/or non-glyceride esters thereof compared to the total weight of fatty acids and non-glyceride esters thereof in the second fatty acid mixture, such as at least 70%, such as at least 80%, or such as at least 90% by weight of C18 fatty acids and/or non-glyceride esters thereof compared to the total weight of fatty acids and non-glyceride esters thereof in the second fatty acid mixture.

In one or more embodiments, C18 fatty acids and/or non-glyceride esters thereof are selected from oleic acid (C18:1) and/or non-glyceride esters thereof, linoleic acid (C18:2) and/or non-glyceride esters therefore, or combinations hereof.

In one or more embodiments, C18 fatty acids and/or non-glyceride esters thereof are selected from stearic acid (C18:0) and/or non-glyceride esters thereof, oleic acid (C18:1) and/or non-glyceride esters thereof, linoleic acid (C18:2) and/or non-glyceride esters therefore, or combinations hereof.

In one or more embodiments, the second fatty acid mixture comprises 8% or less by weight of palmitic acid and/or non-glyceride esters thereof compared to the total weight of fatty acids and non-glyceride esters thereof in the second fatty acid mixture, such as 6% or less, such as 4% or less, such as 3% or less, such as 2% or less, or such as 1% or less by weight of palmitic acid and/or non-glyceride esters thereof compared to the total weight of fatty acids and non-glyceride esters thereof in the second fatty acid mixture.

In one or more embodiments, the second fatty acid mixture comprises at least 70%, such as at least 80%, or such as at least 90% by weight of unsaturated and/or short to medium chain fatty acids, such as C2-C12 fatty acid and/or non-glyceride esters thereof, such as C8-C10 fatty acids and/or non-glyceride esters thereof, compared to the total weight of fatty acids and non-glyceride esters thereof in the second fatty acid mixture. In this embodiment short or short and medium chain fatty acids are used, as this would have similar nutritional effect as unsaturated fatty acids, in the sense that they are easily absorbed even in 1,3-position.

In one or more embodiments, the second mixture of excess free fatty acids and/or non-glyceride esters thereof comprises at least 90% by weight of the free fatty acids and/or non-glyceride esters thereof compared to the total amount of the free fatty acids and/or non-glyceride esters thereof in the second mixture of excess free fatty acids and/or non-glyceride esters thereof and in the final vegetable fat composition, such as at least 95%, or such as at least 98%.

In one or more embodiments, the final vegetable fat composition comprises at least 30% by weight of palmitic acid in the triglycerides compared to the total weight of fatty acids in the triglycerides in the final vegetable fat composition, such as at least 35%, or such as at least 40%. In one or more embodiments, the final vegetable fat composition comprises between 30% and 50% by weight of palmitic acid in the triglycerides compared to the total weight of fatty acids in the triglycerides in the final vegetable fat composition, such as between 35% and 45%, or such as between 40% and 45%.

In one or more embodiments, the proportion of palmitic acid in the sn2 position out of total palmitic acid in the triglycerides of the final vegetable fat composition is at least 50%, such as at least 52%, such as at least 55%, such as at least 60%, or such as at least 70%. In one or more embodiments, the proportion of palmitic acid in the sn2 position out of total palmitic acid in the triglycerides of the final vegetable fat composition is between 40% and 90%, such as between 52% and 85%, such as between 60% and 80%.

In one or more embodiments, the final vegetable fat composition comprises between 4.0% and 9.0% by weight of stearic acid in the triglycerides compared to the total weight of fatty acids in the triglycerides in the final vegetable fat composition, such as between 4.5% and 8.0%, such as between 5.0% and 7.0%, or such as 6.0% by weight of stearic acid in the triglycerides compared to the total weight of fatty acids in the triglycerides in the final vegetable fat composition. In one or more embodiments, the proportion of stearic acid in the sn2 position out of total stearic acid in the triglycerides of the final vegetable fat composition is between 10% and 30%, such as between 10% and 25%, such as between 15% and 25%, or such as between 15% and 20%. This triglyceride structure is more similar to human milk as C18:0 is enriched in sn1 and sn3 positions, i.e. a high proportion of stearic acid if found in the sn1 and sn3 position, which means a high similarity to triglyceride structure of human milk.

In one or more embodiments, C18 fatty acids and/or non-glyceride esters thereof are selected from stearic acid (C18:0) and/or non-glyceride esters thereof, oleic acid (C18:1) and/or non-glyceride esters thereof, linoleic acid (C18:2) and/or non-glyceride esters therefore, or combinations hereof.

In one or more embodiments, the ratio of oleic acid to linoleic acid in the second fatty acid mixture is between 0.5 and 10, such as between 1 and 8, such as between 2 and 6.

In one or more embodiments, the total amount of diglycerides and monoglycerides in the final vegetable fat composition is 8% or less by weight compared to the total weight of the final vegetable fat composition, such as 6% or less, such as 4% or less, or such as 2% or less. One of the effects of having a low amount of e.g. diglycerides is that the fatty acids (e.g. palmitic acid) of the diglycerides tend to isomerise to from 1,2 (2,3)-diglycerides to 1,3-diglycerides and hereby removal of beta-palmitate. Furthermore, high levels of diglycerides can be a disturbance in the analytical method used for determining fatty acid compositions on the sn2 position.

In one or more embodiments, at least 60% of the amount of palmitic acid in the starting vegetable fat composition is present in the final vegetable fat composition, such as at least 70%, such as at least 80%, such as at least 90%, or such as at least 95% of the amount of palmitic acid in the starting vegetable fat composition is present in the final vegetable fat composition.

In one or more embodiments, the final vegetable fat composition is a non-hydrogenated vegetable fat composition.

Hydrogenation is a process where unsaturated fatty acids are made partially saturated. Non-hydrogenated means not hydrogenated or un-hydrogenated. By subjecting unsaturated fatty acids to a process of hydrogenation (e.g. involving a combination of catalysts, hydrogen, and heat), the double bond opens, and hydrogen atoms bind to the carbon atoms, hereby saturating the double bond. While most of the unsaturated oil will either remain as was (on its double bond structure) or be converted to the corresponding saturated fatty acid, some of the double bonds may open during the hydrogenation process and then re-close in another double bond configuration, hereby converting a cis fatty acid to a trans fatty acid or vice versa. A non-hydrogenated vegetable fat composition is a composition comprising only non-hydrogenated fatty acids, meaning that the process of hydrogenation has not been performed on the fatty acids in said composition neither as fatty acids nor esters (including acylglycerols).

In one or more embodiments, the final vegetable fat composition comprises a C52 value of at least 40. It is given in the current National Food Safety Standard (i.e. GB 30604-2015) that OPO is defined as a fat compound with a C52 of at least 40. A C52 of at least 40 means that at least 40% of the composition comprises triglycerides with 52 carbons in its three fatty acids, e.g. C18-C16-C18=18+16+18=52.

In one or more embodiments, the fatty acid non-glyceride esters are selected from methyl esters, ethyl esters, or combinations hereof.

In one or more embodiments, the yield of the amount of obtained final vegetable fat composition is at least 50% compared to the amount of starting vegetable fat composition, such as at least 70%, such as at least 80%, such as at least 90%, or such as at least 95% compared to the amount of starting vegetable fat composition.

A process that is running to a 95% utilization of the starting fat composition to final fat composition means that that 95% of the glycerol backbone of the starting vegetable fat composition is obtained in the final vegetable fat composition. This is obtainable if the physical losses are small and fatty acid composition of product is very similar to starting oil (but positions are changed), which in turn requires a good randomisation in the first transesterification process.

By the yield of the obtained final vegetable fat composition by weight compared to the amount of starting vegetable fat composition is meant that the weight of the final vegetable fat composition is divided by the weight of the starting vegetable fat composition added in the first process step. If the process is a subsequent process restarting from step a it is the amount of added starting vegetable fat composition in that subsequent process cycle.

In one or more embodiments, the process is a continuous process, wherein the continuous process comprises at least the steps a to i, and wherein the process is continued by using at least the first and second palmitic acid rich fractions of step i as at least a part of the first fatty acid mixture in a subsequent process restarting from step a with a new amount of starting vegetable fat composition, wherein the palmitic acid rich fraction as part of the first fatty acid mixture and the new amount of starting vegetable fat composition is processed through step a to i hereby obtaining a subsequent amount of final vegetable fat composition and a subsequent palmitic acid rich fraction, wherein the subsequent palmitic acid rich fraction can then be continued through another subsequent process restarting from step a.

In order to start a continuous process, the process of step a to h is performed once. Then the process can be performed a second/subsequent time, however this time the palmitic acid rich fraction obtained from the first time the process was performed can be used as at least a part of the first fatty acid mixture. Then the palmitic acid rich fraction obtained from the second time the process was performed can be used as at least a part of the first fatty acid mixture in a third cycle of the process.

This means that the palmitic acid rich fraction obtained in preceding run is used as part of the first fatty acid mixture in a present run, hereby obtaining a new palmitic acid rich fraction for use in a subsequent run hereby creating a continuous process, where new amounts of starting vegetable fat compositions needs to be mixed with the palmitic acid rich fraction from the previous run and smaller or no amount of the first fatty acid mixture being from external supply, hereby obtaining a new amount of final vegetable fat composition, which is removed from the continuous process.

When the palmitic acid rich fraction obtained from second mixture of excess free fatty acids is also recycled back as described above, even smaller amounts of the first fatty acid mixture may be needed to be from outside the disclosed process. Further, if the palmitic acid sparse fraction from the first of the second mixture of excess free fatty acids is recycled as at least a part of the second fatty acid mixture in a subsequent process the amount of the second fatty acid mixture needed to be obtained from external supply/outside the disclosed process could also be decreased. If both fractions from both processes are reused and if the process is optimally run, then once the first cycle of the process is completed, only a new amount of starting vegetable fat composition needs to be added to obtain a new amount of final vegetable fat composition, as both the first and second fatty acid mixture would be obtained from the palmitic acid rich and sparse fraction of the previous cycle.

Another way of starting the continuous process could be to take a certain amount of palmitic and low-palmitic fatty acids (the first and second fatty acids mixture). These can be obtained in different ways. One possibility is to first run step a and b but without addition of palmitic acid, and add some low-palmitic acid (the second fatty acid mixture) and do step d and e of the process, and then use the recycled fatty acid from that start up process in the process of claim 1. This first reaction could be with the same starting vegetable fat composition but preferably a vegetable fat composition containing more palmitic acid is used. Another possibility of starting the cycle is that a step d and e is the start-up step of the process where some low-palmitic acid (second fatty acid mixture) is mixed with the vegetable fat composition, which could be the starting vegetable fat composition but preferably is an vegetable fat composition comprising more palmitic acid. Yet another possibility is to use completely external fatty acid mixtures in order to "fill up" the system.

By the process being continued by using at least the first and second palmitic acid rich fractions of step i continued is meant that the process is continued by doing the following steps, meaning that the material downstream is continuously recycled and sent back to earlier process steps. This means that the steps are not done in sequence but all occur at the same time where the early steps use recycled material from the later steps.

In one or more embodiments, the continuous process is performed by transferring back fatty acids that are obtained from one or more of the fractionations and wherein the here from obtained fatty acids are then used in one or more of the transesterification processes, wherein said transesterification may be performed either batch-wise or continuous by e.g. transferring through one or several packed bed columns.

In one or more embodiments, the continuous process further comprises the steps of using the first palmitic acid sparse fraction and/or the second palmitic acid sparse fraction as at least a part of the second fatty acid mixture in a subsequent process restarting from step a with a new amount of starting vegetable fat composition.

In one or more embodiments, the first fatty acid mixture in the subsequent process restarting from step a is comprising at least 50% by weight of fatty acids and/or non-glyceride esters thereof obtained from fractionating the first mixture of excess free fatty acids and/or non-glyceride esters thereof and from fractionating the second mixture of excess free fatty acids and/or non-glyceride esters thereof compared to the total weight of fatty acids in the first fatty acid mixture in the subsequent process restarting from step a, such as at least 70%, such as at least 80%, such as at least 90%, such as at least 95%, or such as substantially 100% by weight of fatty acids and/or non-glyceride esters thereof obtained from fractionating the first mixture of excess free fatty acids and/or non-glyceride esters thereof and from fractionating the second mixture of excess free fatty acids and/or non-glyceride esters thereof compared to the total weight of fatty acids in the first fatty acid mixture in the subsequent process restarting from step a.

By the first fatty acid mixture in the subsequent process restarting from step a is comprising at least 50% by weight of fatty acids and/or non-glyceride esters thereof obtained from fractionating the first mixture of excess free fatty acids and/or non-glyceride esters thereof and from fractionating the second mixture of excess free fatty acids and/or non-glyceride esters thereof compared to the total weight of fatty acids in the first fatty acid mixture in the subsequent process restarting from step a is meant that at least 50% of the fatty acids in a first fatty acid mixture of any cycle of the process is obtained from the fractionation step in the process of the previous cycle.

Further, the 50% by weight of fatty acids is compared to the total weight of fatty acids in the same composition in the same cycle, i.e. the first fatty acid mixture of any cycle of the process after the first cycle, may comprise at least 50% fatty acids in said mixture obtained from fractionating in the previous cycle of the process, where the 50% fatty acids is by weight compared to the total weight of fatty acids in said mixture.

In one or more embodiments, the second fatty acid mixture in the subsequent process restarting from step a is comprising at least 50% by weight of fatty acids and/or non-glyceride esters thereof obtained from fractionating the first mixture of excess free fatty acids and/or non-glyceride esters thereof and/or from fractionating the second mixture of excess free fatty acids and/or non-glyceride esters thereof compared to the total weight of fatty acids in the second fatty acid mixture in the subsequent process restarting from step a, such as at least 70%, such as at least 80%, such as at least 90%, such as at least 95%, or such as substantially 100% by weight of fatty acids and/or non-glyceride esters thereof obtained from fractionating the first mixture of excess free fatty acids and/or non-glyceride esters thereof and/or from fractionating the second mixture of excess free fatty acids and/or non-glyceride esters thereof compared to the total weight of fatty acids in the second fatty acid mixture in the subsequent process restarting from step a.

In one or more embodiments, no additional fatty acid mixtures are added to the subsequent process restarting from step a other than the starting vegetable fat composition, meaning that no other raw materials than the starting vegetable fat composition is used.

By no additional fatty acid mixtures being added to the subsequent process is meant that all the fatty acids being added as the first fatty acid mixture and the second fatty acid mixture is obtained from fractionating the first mixture of excess free fatty acids and/or non-glyceride esters thereof and from fractionating the second mixture of excess free fatty acids and/or non-glyceride esters thereof.

In one or more embodiments, the yield of the amount of obtained final vegetable fat composition is at least 50% compared to the amount of starting vegetable fat composition and any fatty acids and/or non-glyceride ester thereof that are not stemming from the steps g and h of a previous cycle, such as at least 70%, such as at least 80%, such as at least 90%, or such as at least 95% compared to the amount of starting vegetable fat composition and any fatty acids and/or non-glyceride ester thereof that are not stemming from the steps g and h of a previous cycle.

In one or more embodiments, there is at least 30% by weight of palmitic acid in the final triglyceride composition compared to the total weight of fatty acids in the final triglyceride composition, such as at least 35%, or such as at least 40%.

In one or more embodiments according to the second aspect, the vegetable fat composition comprises between 30% and 50% by weight of palmitic acid in the triglycerides compared to the total weight of fatty acids in the triglycerides, such as between 35% and 45%, or such as between 40% and 45%.

In one or more embodiments according to the second aspect, the proportion of palmitic acid in the sn2 position out of total palmitic acid in the triglycerides is at least 50%, such as at least 52%, such as at least 55%, or such as at least 60%, or such as at least 70%. In one or more embodiments according to the second aspect, the proportion of palmitic acid in the sn2 position out of total palmitic acid in the triglycerides is between 50% and 90%, such as between 52% and 85%.

In one or more embodiments according to the second aspect, the vegetable fat composition comprises between 4.0% and 9.0% by weight of stearic acid in the triglycerides compared to the total weight of fatty acids in the triglycerides, such as between 4.5% and 8.0%, such as between 5.0% and 7.0%, or such as 6.0% by weight of stearic acid in the triglycerides compared to the total weight of fatty acids in the triglycerides.

In one or more embodiments according to the second aspect, the proportion of stearic acid in the sn2 position out of total stearic acid in the triglycerides is between 10% and 30%, such as between 10% and 25%, such as between 15% and 25%, or such as between 15% and 20%.

In one or more embodiments according to the second aspect, the ratio of oleic acid to linoleic acid in the triglyceride of the final vegetable fat composition is between 0.5 and 10, such as between 1 and 8, such as between 2 and 6.

In one or more embodiments according to the second aspect, the vegetable fat composition comprises 8% or less by weight diglycerides and monoglycerides compared to the total weight of the vegetable fat composition, such as 6% or less, such as 4% or less, or such as 2% or less.

In one or more embodiments according to the third aspect, the processed vegetable fat composition comprises at least 35% by weight of palmitic acid in the triglycerides compared to the total weight of fatty acids in the triglycerides, such as at least 40%. In one or more embodiments according to the third aspect, the processed vegetable fat composition comprises between 30% and 50% by weight of palmitic acid in the triglycerides compared to the total weight of fatty acids in the triglycerides, such as between 35% and 45%, or such as between 40% and 45%.

In one or more embodiments according to the third aspect, the proportion of palmitic acid in the sn2 position out of total palmitic acid in the triglycerides is at least 50%, such as at least 52%, such as at least 55%, such as at least 60%, or such as at least 70%. In one or more embodiments according to the third aspect, the proportion of palmitic acid in the sn2 position out of total palmitic acid in the triglycerides is between 50% and 90%, such as between 52% and 85%.

In one or more embodiments according to the third aspect, the processed vegetable fat composition comprises between 4.0% and 9.0% by weight stearic acid in the triglycerides compared to the total weight of fatty acids in the triglycerides, such as between 4.5% and 8.0%, such as between 5.0% and 7.0%, or such as 6.0% by weight stearic acid in the triglycerides compared to the total weight of fatty acids in the triglycerides.

In one or more embodiments according to the third aspect, the proportion of stearic acid in the sn2 position out of total stearic acid in the triglycerides is between 10% and 30%, such as between 10% and 25%, such as between 15% and 25%, or such as between 15% and 20%.

In one or more embodiments according to the third aspect, the ratio of oleic acid to linoleic acid in the triglyceride of the processed vegetable fat composition is between 0.5 and 10, such as between 1 and 8, such as between 2 and 6.

In one or more embodiments according to the third aspect, the processed vegetable fat composition comprises 8% or less by weight diglycerides and monoglycerides compared to the total weight of the processed vegetable fat composition, such as 6% or less, such as 4% or less, or such as 2% or less.

When describing the embodiments, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The invention will hereafter be described by way of the following non-limiting items.

1. A process for making a final vegetable fat composition with palmitic acid increased in the sn2 position compared to a starting vegetable fat composition, the process comprising the following steps:
   a. mixing a starting vegetable fat composition with a first fatty acid mixture to obtain a first process mixture, wherein the starting vegetable fat composition comprises between 15% and 75% by weight of palmitic acid in the triglycerides compared to the total weight of fatty acids in the triglycerides in the starting vegetable fat composition and the first fatty acid mixture comprises at least 75% by weight of palmitic acid (C16:0) and/or non-glyceride esters thereof compared to the total weight of fatty acids and non-glyceride esters thereof in the first fatty acid mixture;
   b. performing a first transesterification process to the first process mixture to obtain a first transesterified mixture comprising a mixture of free fatty acids and/or non-glyceride esters thereof and transesterified triglycerides;
   c. separating the free fatty acids and/or non-glyceride esters thereof from the transesterified triglycerides of the first transesterified mixture to obtain an intermediate vegetable fat composition and a first mixture of excess free fatty acids and/or non-glyceride esters thereof;
   d. mixing the intermediate vegetable fat composition with a second fatty acid mixture to obtain a second process mixture, wherein the second fatty acid mixture comprises 10% or less by weight of palmitic acid and/or non-glyceride esters thereof compared to the total weight of fatty acids and non-glyceride esters thereof in the second fatty acid mixture;
   e. performing a second transesterification process to the second process mixture by use of one or more 1,3-specific lipases to obtain a second transesterified mixture comprising a mixture of free fatty acids and/or non-glyceride esters thereof and transesterified triglycerides;

f. separating the free fatty acids and/or non-glyceride esters thereof from the transesterified triglycerides of the second transesterified mixture to obtain the final vegetable fat composition with palmitic acid increased in the sn2 position compared to the starting vegetable fat composition and a second mixture of excess free fatty acids and/or non-glyceride esters thereof;

g. fractionating the first mixture of excess free fatty acids and/or non-glyceride esters thereof to obtain at least a first palmitic acid rich fraction and a first palmitic acid sparse fraction, wherein the first palmitic acid rich fraction comprises at least 75% by weight of palmitic acid and/or non-glyceride esters thereof compared to the total weight of fatty acids and non-glyceride esters thereof in the first palmitic acid rich fraction and the first palmitic acid sparse fraction preferably comprises 15% or less, such as 10% or less by weight of palmitic acid and/or non-glyceride esters thereof compared to the total weight of fatty acids and non-glyceride esters thereof in the first palmitic acid sparse fraction;

h. fractionating the second mixture of excess free fatty acids and/or non-glyceride esters thereof to obtain at least a second palmitic acid rich fraction and a second palmitic acid sparse fraction, wherein the second palmitic acid rich fraction comprises at least 75% by weight of palmitic acid and/or non-glyceride esters thereof compared to the total weight of fatty acids and non-glyceride esters thereof in the second palmitic acid rich fraction and the second palmitic acid sparse fraction preferably comprises 15% or less, such as 10% or less by weight of palmitic acid and/or non-glyceride esters thereof compared to the total weight of fatty acids and non-glyceride esters thereof in the second palmitic acid sparse fraction;

i. using at least the first and second palmitic acid rich fractions as at least a part of the first fatty acid mixture in a subsequent process restarting from step a with a new amount of starting vegetable fat composition.

2. The process according to item 1, further comprising the step of using the first palmitic acid sparse fraction as at least a part of the second fatty acid mixture in a subsequent process restarting from step a with a new amount of starting vegetable fat composition and/or using the second palmitic acid sparse fraction as at least a part of the second fatty acid mixture in a subsequent process restarting from step a with a new amount of starting vegetable fat composition.

3. The process according to according to any one of the preceding items, wherein the first mixture of excess free fatty acids and/or non-glyceride esters thereof and the second mixture of excess free fatty acids and/or non-glyceride esters thereof is combined into one mixture prior to fractionating the mixture into at least a palmitic acid rich fraction and a palmitic acid sparse fraction.

4. The process according to according to any one of the preceding items, further comprising the step of refining the final vegetable fat composition, such as by deodorization, bleaching, neutralization, and/or filtering.

5. The process according to any one of the preceding items, further comprising at least one step to reduce partial acylglycerols, wherein the at least one step is one or more of the steps selected from the group consisting of:

having molecular sieves or other water adsorbents or absorbents present in or in parts of the first and/or second transesterification process;

treatment with lipase with specificity for partial acylglycerols removing water during or after the first transesterification process and/or the second transesterification process by partial vacuum or nitrogen gas bubbling;

performing an esterification process after the first transesterification process and/or the second transesterification process by using a lipase and conditions promoting esterification;

performing an esterification process after the first transesterification process and/or the second transesterification process with elevated temperature and reduced pressure to remove the water formed in esterification.

6. The process according to any one of the preceding items, wherein the starting vegetable fat composition is partially or fully hydrolysed before mixing the starting vegetable fat composition with the first fatty acid mixture, and wherein the hydrolysed fatty acids of the starting vegetable fat composition are not separated from the hydrolysed mixture before mixing with the first fatty acid mixture.

7. The process according to any one of the preceding items, wherein the weight ratio of the first fatty acid mixture to the starting vegetable oil composition is between 0.5 and 5.0, such as between 1.0 and 3.0, or such as between 2.0 and 2.5.

8. The process according to any one of the preceding items, wherein the weight ratio of the second fatty acid mixture to the intermediate vegetable fat composition is between 0.5 and 5.0, such as between 1.0 and 3.0, or such as between 2.0 and 2.5.

9. The process according to any one of the preceding items, wherein no catalyst is used in the first transesterification process.

10. The process according to any of items 1-8, wherein the first transesterification step is performed by a transesterification process by adding one or more lipases to the first process mixture.

11. The process according to item 10, wherein the one or more lipases used in the first transesterification step has little or no 1,3-positional specificity.

12. The process according to item 10, wherein the one or more lipase enzymes used in the first transesterification step is one or more 1,3-position specificity lipases, and wherein the 1,3-position specificity is counteracted by means of adding one or more diacylglycerol isomerizing compounds to the first process mixture.

13. The process according to item 12, wherein the diacylglycerol isomerizing compound is silica gel.

14. The process according to any one of the preceding items, wherein no chemical catalyst is used in any step of the process.

15. The process according to any one of the preceding items, wherein any enzyme used is a non-genetically modified enzyme or a non-genetically modified produced enzyme.

16. The process according to any one of the preceding items, wherein no organic solvents are used in any in step of the process.

17. The process according to any one of the preceding items, wherein the first fatty acid mixture comprises at least 80% by weight of palmitic acid and/or non-glyceride esters thereof compared to the total weight of fatty acids and non-glyceride esters thereof in the first fatty acid mixture, such as at least 85%, such as at least 90%, or such as at least 95% by weight of palmitic acid and/or non-glyceride esters thereof compared to the total weight of fatty acids and non-glyceride esters thereof in the first fatty acid mixture.
18. The process according to any one of the preceding items, wherein the first fatty acid mixture comprises 15% or less by weight of stearic acid (C18:0) and/or non-glyceride esters thereof compared to the total weight of fatty acids and non-glyceride esters thereof in the first fatty acid mixture, such as 10% or less, or such as 5% or less.
19. The process according to any one of the preceding items, wherein the starting vegetable fat composition is selected from a palm oil or fraction such as palm olein oil or single stage dry fractionated palm stearin or derivative thereof, rice bran oil, peanut oil, cotton seed oil, or combinations hereof.
20. The process according to any one of the preceding items, wherein the first mixture of excess free fatty acids and/or non-glyceride esters thereof comprises at least 90% by weight of the free fatty acids and/or non-glyceride esters thereof compared to the combined total amount of the free fatty acids and/or non-glyceride esters thereof in the first mixture of excess free fatty acids and/or non-glyceride esters thereof and the intermediate vegetable fat composition, such as at least 95%, or such as at least 98%.
21. The process according to any one of the preceding items, wherein the intermediate vegetable fat composition comprises at least 50% by weight of palmitic acid in the triglycerides compared to the total weight of fatty acids in the triglycerides in the intermediate vegetable fat, such as at least 60%, such as at least 70%, or such as at least 80% by weight of palmitic acid in the triglycerides compared to the total weight of fatty acids in the triglycerides in the intermediate vegetable fat.
22. The process according to any one of the preceding items, wherein the proportion of palmitic acid in the sn2 position out of total palmitic acid in the triglycerides of the intermediate vegetable fat composition is at least 25%, such as at least 27%, such as at least 29%, such as at least 30%, such as at least 31%, such as at least 32%, or such as substantially 33%.
23. The process according to any one of the preceding items, wherein the second fatty acid mixture comprises at least 4% by weight of stearic acid and/or non-glyceride esters thereof compared to the total weight of fatty acids and non-glyceride esters thereof in the second fatty acid mixture, such as at least 5%, or such as at least 6%.
24. The process according to any one of the preceding items, wherein the second fatty acid mixture comprises at least 60% by weight of C18 fatty acids and/or non-glyceride esters thereof compared to the total weight of fatty acids and non-glyceride esters thereof in the second fatty acid mixture, such as at least 70%, such as at least 80%, or such as at least 90% by weight of C18 fatty acids and/or non-glyceride esters thereof compared to the total weight of fatty acids and non-glyceride esters thereof in the second fatty acid mixture.
25. The process according to any one of the preceding items, wherein the second fatty acid mixture comprises 8% or less by weight of palmitic acid and/or non-glyceride esters thereof compared to the total weight of fatty acids and non-glyceride esters thereof in the second fatty acid mixture, such as 6% or less, such as 4% or less, such as 3% or less, such as 2% or less, or such as 1% or less by weight of palmitic acid and/or non-glyceride esters thereof compared to the total weight of fatty acids and non-glyceride esters thereof in the second fatty acid mixture.
26. The process according to any one of the preceding items, wherein the second fatty acid mixture is enriched in unsaturated and/or short to medium chain fatty acids, such as C2-C12 fatty acid, or such as C8-C10 fatty acids.
27. The process according to any one of the preceding items, wherein the second mixture of excess free fatty acids and/or non-glyceride esters thereof comprises at least 90% by weight of the free fatty acids and/or non-glyceride esters thereof compared to the combined total amount of the free fatty acids and/or non-glyceride esters thereof in the second mixture of excess free fatty acids and/or non-glyceride esters thereof and the final vegetable fat composition, such as at least 95%, or such as at least 98%.
28. The process according to any one of the preceding items, wherein the final vegetable fat composition comprises at least 30% by weight of palmitic acid in the triglycerides compared to the total weight of fatty acids in the triglycerides in the final vegetable fat composition, such as at least 35%, or such as at least 40%.
29. The process according to any one of the preceding items, wherein the proportion of palmitic acid in the sn2 position out of total palmitic acid in the triglycerides of the final vegetable fat composition is at least 50%, such as at least 52%, such as at least 55%, such as at least 60%, or such as at least 70%.
30. The process according to any one of the preceding items, wherein the final vegetable fat composition comprises between 4.0% and 9.0% by weight of stearic acid in the triglycerides compared to the total weight of fatty acids in the triglycerides in the final vegetable fat composition, such as between 4.5% and 8.0%, such as between 5.0% and 7.0%, or such as 6.0% by weight of stearic acid in the triglycerides compared to the total weight of fatty acids in the triglycerides in the final vegetable fat composition.
31. The process according to any one of the preceding items, wherein the proportion of stearic acid in the sn2 position out of total stearic acid in the triglycerides of the final vegetable fat composition is between 10% and 30%, such as between 10% and 25%, such as between 15% and 25%, or such as between 15% and 20%.
32. The process according to any one of the preceding items, wherein the ratio of oleic acid to linoleic acid in the second fatty acid mixture is between 0.5 and 10, such as between 1 and 8, such as between 2 and 6.
33. The process according to any one of the preceding items, wherein the total amount of diglycerides and monoglycerides in the final vegetable fat composition is 8% or less by weight compared to the total weight of the final vegetable fat composition, such as 6% or less, such as 4% or less, or such as 2% or less.
34. The process according to any one of the preceding items, wherein at least 60% of the amount of palmitic acid in the starting vegetable fat composition is present in the final vegetable fat composition, such as at least 70%, such as at least 80%, such as at least 90%, or such as at least 95% of the amount of palmitic acid in the starting vegetable fat composition is present in the final vegetable fat composition.

35. The process according to any one of the preceding items, wherein the yield of the amount of obtained final vegetable fat composition is at least 50% compared to the amount of starting vegetable fat composition, such as at least 70%, such as at least 80%, such as at least 90%, or such as at least 95% compared to the amount of starting vegetable fat composition.

36. The process according any one of the preceding items, wherein the process is a continuous process, wherein the continuous process comprises at least the steps a to i, and wherein the process is continued by using at least the first and second palmitic acid rich fractions of step i as at least a part of the first fatty acid mixture in a subsequent process restarting from step a with a new amount of starting vegetable fat composition, wherein the palmitic acid rich fraction as part of the first fatty acid mixture and the new amount of starting vegetable fat composition is processed through step a to i hereby obtaining a subsequent amount of final vegetable fat composition and a subsequent palmitic acid rich fraction, wherein the subsequent palmitic acid rich fraction can then be continued through another subsequent process restarting from step a.

37. The process according to item 36, wherein the continuous process is performed by transferring back fatty acids that are obtained from one or more of the fractionations and wherein the here from obtained fatty acids are then used in one or more of the transesterification processes, wherein said transesterification may be performed either batch-wise or continuous.

38. The process according to any one of items 36-37, further comprising the step of using the first palmitic acid sparse fraction and/or the second palmitic acid sparse fraction as at least a part of the second fatty acid mixture in a subsequent process restarting from step a with a new amount of starting vegetable fat composition.

39. The process according to any one of items 36-38, wherein the first fatty acid mixture in the subsequent process restarting from step a is comprising at least 50% by weight of fatty acids and/or non-glyceride esters thereof obtained from fractionating the first mixture of excess free fatty acids and/or non-glyceride esters thereof and from fractionating the second mixture of excess free fatty acids and/or non-glyceride esters thereof compared to the total weight of fatty acids in the first fatty acid mixture in the subsequent process restarting from step a, such as at least 70%, such as at least 80%, such as at least 90%, such as at least 95%, or such as substantially 100% by weight of fatty acids and/or non-glyceride esters thereof obtained from fractionating the first mixture of excess free fatty acids and/or non-glyceride esters thereof and from fractionating the second mixture of excess free fatty acids and/or non-glyceride esters thereof compared to the total weight of fatty acids in the first fatty acid mixture in the subsequent process restarting from step a.

40. The process according to any one of items 36-39, wherein the second fatty acid mixture in the subsequent process restarting from step a is comprising at least 50% by weight of fatty acids and/or non-glyceride esters thereof obtained from fractionating the first mixture of excess free fatty acids and/or non-glyceride esters thereof and from fractionating the second mixture of excess free fatty acids and/or non-glyceride esters thereof compared to the total weight of fatty acids in the second fatty acid mixture in the subsequent process restarting from step a, such as at least 70%, such as at least 80%, such as at least 90%, such as at least 95%, or such as substantially 100% by weight of fatty acids and/or non-glyceride esters thereof obtained from fractionating the first mixture of excess free fatty acids and/or non-glyceride esters thereof and/or from fractionating the second mixture of excess free fatty acids and/or non-glyceride esters thereof compared to the total weight of fatty acids in the second fatty acid mixture in the subsequent process restarting from step a.

41. The process according to any one of items 36-40, wherein no additional fatty acid mixtures are added to the subsequent process restarting from step a.

42. The process according to any one of items 36-41, wherein the yield of the amount of obtained final vegetable fat composition is at least 50% compared to the amount of starting vegetable fat composition and any fatty acids and/or non-glyceride ester thereof that are not stemming from the steps g and h of a previous cycle, such as at least 70%, such as at least 80%, such as at least 90%, or such as at least 95% compared to the amount of starting vegetable fat composition and any fatty acids and/or non-glyceride ester thereof that are not stemming from the steps g and h of a previous cycle.

43. A vegetable fat composition having palmitic acid present in the sn2 position manufactured according to any one of items 1-42

44. The vegetable fat composition according item 43, comprising at least 30% by weight of palmitic acid in the triglycerides compared to the total weight of fatty acids in the triglycerides, such as at least 35%, or such as at least 40%.

45. The vegetable fat composition according to any one of items 43-44, wherein the proportion of palmitic acid in the sn2 position out of total palmitic acid in the triglycerides is at least 50%, such as at least 52%, such as at least 55%, such as at least 60%, or such as at least 70%.

46. The vegetable fat composition according to any one of items 43-45, comprising between 4.0% and 9.0% by weight of stearic acid in the triglycerides compared to the total weight of fatty acids in the triglycerides, such as between 4.5% and 8.0%, such as between 5.0% and 7.0%, or such as 6.0% by weight of stearic acid in the triglycerides compared to the total weight of fatty acids in the triglycerides.

47. The vegetable fat composition according to any one of items 43-46, wherein the proportion of stearic acid in the sn2 position out of total stearic acid in the triglycerides is between 10% and 30%, such as between 10% and 25%, such as between 15% and 25%, or such as between 15% and 20%.

48. The vegetable fat composition according to any one of items 43-47, wherein the ratio of oleic acid to linoleic acid in the triglyceride of the final vegetable fat composition is between 0.5 and 10, such as between 1 and 8, such as between 2 and 6.

49. The vegetable fat composition according to any one of items 43-48, comprising 8% or less by weight diglycerides and monoglycerides compared to the total weight of the vegetable fat composition, such as 6% or less, such as 4% or less, or such as 2% or less.

50. A processed vegetable fat composition of vegetable origin for use in a blend with other fat compositions for an infant formula, wherein the processed vegetable fat composition comprises at least 30% by weight of palmitic acid in the triglycerides compared to the total weight of fatty acids in the triglycerides and the proportion of palmitic acid in the sn2 position out of total palmitic acid in the triglycerides is at least 50%.
51. The processed vegetable fat composition according to item 50, comprising at least 35% by weight of palmitic acid in the triglycerides compared to the total weight of fatty acids in the triglycerides, such as at least 40%.
52. The processed vegetable fat composition according to any one of items 50-51, wherein the proportion of palmitic acid in the sn2 position out of total palmitic acid in the triglycerides is at least 52%, such as at least 55%, such as at least 60%, or such as at least 70%.
53. The processed vegetable fat composition according to any one of items 50-52, comprising between 4.0% and 9.0% by weight stearic acid in the triglycerides compared to the total weight of fatty acids in the triglycerides, such as between 4.5% and 8.0%, such as between 5.0% and 7.0%, or such as 6.0% by weight stearic acid in the triglycerides compared to the total weight of fatty acids in the triglycerides.
54. The processed vegetable fat composition according to any one of items 50-53, wherein the proportion of stearic acid in the sn2 position out of total stearic acid in the triglycerides is between 10% and 30%, such as between 10% and 25%, such as between 15% and 25%, or such as between 15% and 20%.
55. The processed vegetable fat composition according to any one of items 50-54, wherein the ratio of oleic acid to linoleic acid in the triglyceride of the processed vegetable fat composition is between 0.5 and 10, such as between 1 and 8, such as between 2 and 6.
56. The processed vegetable fat composition according to any one of items 50-55, comprising 8% or less by weight diglycerides and monoglycerides compared to the total weight of the processed vegetable fat composition, such as 6% or less, such as 4% or less, or such as 2% or less.
57. Use of a vegetable fat composition having palmitic acid present in the sn2 position according to any one of items 43-49 or a processed vegetable fat composition according to any one of items 50-56 in the manufacture of an infant formula.
58. Use of a vegetable fat composition having palmitic acid present in the sn2 position according to any one of items 43-49 or a processed vegetable fat composition according to any one of items 50-56 in the manufacture of a plant based food product, such as milk free infant food products.
59. An infant formula comprising between 15% to 100% by weight, such as 15% to 99% by weight of a vegetable fat composition having palmitic acid present in the sn2 position according to any one of items 43-49 or a processed vegetable fat composition according to any one of items 50-56 compared to the total amount of fat composition in said infant formula.

Various examples are described hereinafter with reference to the figures. It should also be noted that the figures are only intended to facilitate the description of the examples. They are not intended as an exhaustive description of the claimed invention or as a limitation on the scope of the claimed invention. In addition, an illustrated example needs not have all the aspects or advantages shown. An aspect or an advantage described in conjunction with a particular example is not necessarily limited to that example and can be practiced in any other examples even if not so illustrated, or if not so explicitly described.

EXAMPLES

Fatty acid composition is given as % of fatty acid residues and is analysed with IUPAC 2.304.

Fatty acid composition in the sn2 position is given as % of fatty acid residues in the sn2 position and is analysed with IUPAC 2.210.

% C16:0 in sn2 out of total C16:0 is calculated as 100/3*(C16:0 in the sn2 position measured with IUPAC 2.210)/(C16:0 measured with IUPAC 2.304), where the 3 in the denominator is due to the three positions in the triglycerides.

Triglyceride composition C48-C54 is given in % of triglycerides and is analysed with IUPAC 2.323.

Diglycerides and monoglycerides are given in % of acylglycerols and analysed with AOCS Cd 11d-96.

Free fatty acids are given as % of either palmitic or oleic acid residues and are analysed with IUPAC 2.201.

Iodine value is analysed with IUPAC 2.205.

Comparative Example

A chemically interesterified palm stearin IV 34 with 59.7% palmitic acid was transesterified with oleic acid fatty acid (45:55 ratio) using an immobilized 1,3 specific lipase from *Rhizopus oryzae*. The degree of interesterification was 93%. The residual fatty acids were separated from the acylglycerols by distillation.

TABLE 1

| | Oleic fatty acid | Palm stearin IV 34 | Resulting product |
|---|---|---|---|
| IV | | 34.1 | |
| C16 | 1.4 | 59.7 | 34.3 |
| C18:0 | 2.3 | 5.4 | 3.9 |
| C18:1 | 82.1 | 26.6 | 50.8 |
| C18:2 | 13.1 | 6.0 | 9.2 |
| % C16:0 in sn2 out of total fatty acids in sn2 | | 59.7 | 55.8 |
| % C16:0 in sn2 out of total C16:0 | | | 54.2 |
| % C18:0 in sn2 out of total C18:0 | | | 42.4 |
| Degree of interesterification* | | | 0.93 |

*ratio of oleic acid in sn1 and 3 (calculated by difference of total and sn2) to oleic acid in the fatty acids removed by distillation.

Comparative Example 2

Palm stearin of iodine value (IV) 19.2 (obtained in a yield of approximately 7% from organically certified palm oil via two dry fractionations) which contained 74.4% palmitic acid residues was transesterified with oleic acid fatty acid (1:1.5 ratio) using an immobilized 1,3 specific lipase from *Rhizopus oryzae* to a degree of interesterification of 90%. The residual fatty acids were separated from the acylglycerols by distillation.

TABLE 2

| | Oleic fatty acid | Palm stearin | Resulting product |
|---|---|---|---|
| IV | | 19.2 | |
| C16 | 1.4 | 74.4 | 39.9 |
| C18:0 | 2.3 | 5.9 | 3.8 |
| C18:1 | 82.1 | 14.9 | 46.5 |
| C18:2 | 13.1 | 3.3 | 8.4 |
| % C16:0 in sn2 out of total fatty acids in sn2 | | 65.1 | 62.2 |
| % C16:0 in sn2 out of total C16:0 | | | 52.0 |
| % C18:0 in sn2 out of total C18:0 | | | 32.1 |
| Degree of interesterification* | | | 0.90 |

*ratio of oleic acid in sn1 and 3 (calculated by difference of total and sn2) to oleic acid in the fatty acids removed by distillation.

Example 1

A start up step was performed by transesterification of an organically certified palm stearin and an organically certified oleic fatty acid with immobilized 1,3 specific lipase from *Rhizopus oryzae*. The residual fatty acids were separated from the acylglycerols by distillation. A fractional distillation separated the fatty acids into a palmitic acid rich fraction containing 87% palmitic acid and an oleic acid rich fraction containing <1% palmitic acid while containing 77% oleic acid.

The start up step shown above, is one way of obtaining a palmitic acid rich fraction and a palmitic acid sparse fraction (the oleic acid rich fraction). The step is performed to obtain the first fatty acid mixture and the second fatty acid mixture, as they are needed in the process. Even though the above method is shown, the fractions may be obtained in various different ways as disclosed in the description.

A first cycle of the process was performed in three steps:

The first step was enzymatic transesterification of 1 part of certified organic palm oil with 3 parts of the palmitic acid rich fraction from the start up step (the fraction containing 87% palmitic acid). The enzymatic transesterification was performed using 7% of an immobilized 1,3 specific lipase from *Rhizopus oryzae,* 2% water, and 3% silica gel (Trisyl 150 IE, Grace), where the % is based on weight of the combined weight of the mixture of palm oil and palmitic acid rich fraction. The transesterification reaction was divided into two parts, in the first part the lipase, the silica gel and the water were added to the palm oil and was reacted for 4 hours under stirring at 70° C. After 4 hours the palmitic acid rich fraction was added and the reaction was continued for another 20 hours at 70 r under stirring and with slow evaporation of water. After removing the lipase and silica gel the reaction mixture was distilled to separate free fatty acids from acylglycerols, hereby obtaining an acylglycerol mixture.

The analysis of the reaction are given in table 3:

TABLE 3

| | Palmitic acid rich fraction | Palm oil | Reaction mixture after 4 hours/before addition of palmitic rich fraction | Acylglycerol mixture after trans-esterification and distillation |
|---|---|---|---|---|
| C16:0 | 86.8 | 43.4* | | 72.3** |
| C18:0 | 0.2 | 4.7 | | 1.6 |
| C18:1 | 9.7 | 40.0 | | 20.6 |
| C18:2 | 1.7 | 9.6 | | 3.7 |
| C48 | | 7.9 | 10.0 | 45.0 |
| C50 | | 41.0 | 32.6 | 41.8 |
| C52 | | 40.5 | 39.0 | 10.4 |
| C54 | | 10.1 | 16.4 | 0.4 |
| Free fatty acids (as palmitic acid) | | <0.1 | 17.6 | 2.7 |
| Monoglycerides | | <0.1 | 1.6 | <0.1 |
| Diglycerides | | 4.9 | 32.02 | 1.4 |

*of which 12.6% was in sn-2 position

**of which 29.6% was in sn-2 position.

The second step was performed by transesterification of 0.89 parts of acylglycerol mixture from step 1 and 1.36 parts of oleic acid rich fraction from the start up step at 60° C. using an immobilized 1,3 specific lipase from *Rhizopus oryzae* to a degree of interesterification of 95%. The resulting oil after transesterification was distilled to separate free fatty acids from acylglycerols hereby obtaining a final oil composition. 0.87 units of the final oil composition was obtained.

The analysis of the reaction are given in table 4:

TABLE 4

| | Oleic acid rich fraction | Mixture after trans-esterification | Final oil composition |
|---|---|---|---|
| C16:0 | 0.9 | | 36.7 |
| C18:0 | 7.9 | | 4.8 |
| C18:1 | 77.1 | | 48.3 |
| C18:2 | 11.9 | | 7.7 |
| % C16:0 in sn2 out of total fatty acids in sn2 | | | 58.6 |
| % C16:0 in sn2 out of total C16:0 | | | 53.2 |
| % C18:0 in sn2 out of total C18:0 | | | 21.6 |
| C48 | | 7.8 | |
| C50 | | 30.1 | |
| C52 | | 43.0 | |
| C54 | | 18.5 | |
| Free fatty acids (as oleic acid) | | | 0.9 |
| Monoglycerides | | | <0.1 |
| Diglycerides | | | 3.2 |
| Degree of interesterification* | | | 0.95 |

*ratio of oleic acid in sn1 and 3 (calculated by difference of total and sn2) to oleic acid in the fatty acids removed by distillation.

The third step was performed by combining the free fatty acids removed by distillation at the end of step 1 and step 2. This combined mixture was distilled again to separate it into 2.65 parts of a palmitic acid rich fraction and 1.13 parts of a palmitic acid low fraction.

The analysis of the distillation is given in table 5:

TABLE 5

| | Palmitic acid rich fraction | Palmitic acid low fraction |
|---|---|---|
| C16:0 | 85.9 | 1.4 |
| C18:0 | 0.2 | 8.3 |

TABLE 5-continued

| | Palmitic acid rich fraction | Palmitic acid low fraction |
|---|---|---|
| C18:1 | 10.6 | 75.5 |
| C18:2 | 1.8 | 12.8 |

A second cycle of the process was performed in three steps:

Step 1 of the first cycle was repeated using 0.88 parts of the same palm oil as in first cycle and 2.64 parts of the palmitic acid rich fraction from step 3 of the first cycle.

The analysis of the reaction are given in table 6:

TABLE 6

| | Acylglycerol mixture after distillation |
|---|---|
| C16:0 | 71.4* |
| C18:0 | 1.7 |
| C18:1 | 21.9 |
| C18:2 | 3.1 |
| C48 | 42.6 |
| C50 | 42.6 |
| C52 | 10.7 |
| C54 | 1.0 |
| Free fatty acids (as palmitic acid) | 1.6 |

*of which 30.5% was in sn2-position.

Step 2 of the first cycle was repeated with 0.79 parts of the acylglycerol mixture from step 1 of the second cycle and 1.13 parts of the palmitic acid low fraction from step 3 of cycle 1. The degree of interesterification was 89%. After distillation 0.78 units of the final oil composition was obtained.

The analysis of the reaction are given in table 7:

TABLE 7

| | Final oil composition |
|---|---|
| C16:0 | 39.4 |
| C18:0 | 4.7 |
| C18:1 | 45.8 |
| C18:2 | 8.1 |
| % C16:0 in sn2 out of total fatty acids in sn2 | 62.3 |
| % C16:0 in sn2 out of total C16:0 | 52.7 |
| % C18:0 in sn2 out of total C18:0 | 18.8 |
| C48 | 9.1 |
| C50 | 34.0 |
| C52 | 41.1 |
| C54 | 14.9 |
| Degree of interesterification* | 0.89 |
| Free fatty acids (as oleic acid) | 0.7 |

*ratio of oleic acid in sn1 and 3 (calculated by difference of total and sn2) to oleic acid in the fatty acids removed by distillation.

The yield of the final product in step 2 of cycle 2 compared to the starting triglyceride composition was 0.78/0.88=89%

The yield of palmitic acid from the starting palm oil can be calculated as follows:

0.78 parts of product in step 2 of cycle 2 containing 39.4% palmitic acid (equivalent to 30.732 parts palmitic acid) divided by 0.88 parts of palm oil containing 43.4% palmitic acid in step 1 of cycle 2 (equivalent to 38.192 parts palmitic acid)=30.732 divided by 38.192=80.46%

As can be seen from the results of experiment 1 a circular process is achieved, i.e. the recycled palmitic acid in step 3 of cycle 1 is used in steps 1 and 2 of cycle 2 (and the residual fatty acids from steps 2 and 3 of cycle 2 can be recycled to be used in a further cycle 3 etc.). Further cycles can be added, as it is believed that the losses will be lower when running in plant scale and continuous operation.

The same immobilized 1,3-specific lipase from *Rhizopus oryzae* was used in all steps of the example.

Parts are parts by weight and use of parts instead of absolute weights is to make it easier to follow the different streams.

Example 2

Enzymatic transesterification of 1 part of certified organic palm oil with 3 parts of fatty acids containing 87% palmitic acid residues was performed using 7% of an immobilized 1,3-specific lipase from *Rhizopus oryzae*. Some of the experiments were run with only the water contained in the immobilised lipase whereas other experiments were performed with addition of extra water. There were also experiments with or without addition of silica gel (Trisyl 150 IE, Grace). The experiments are outlined in table 8, where the % is based on weight of the combined weight of the mixture of palm oil and palmitic rich fraction. In some of the transesterification reactions all the reactants and additives were added from the start whereas in other experiments the process was divided into two parts. When divided into two part, the first part is the lipase, any silica gel, and water were, which is added to the palm oil and reacted for 4 hours under stirring at 70° C. and the second part is that after 4 hours the palmitic rich fraction is added and the reaction was continued for another 20 hours at 70° C. under stirring and with slow evaporation of water. When the process was not divided into two parts all reactants and additives were added from the start and reaction was for left for 24 hours at 70° C. under stirring. It is believed that partially hydrolysing the palm oil by adding water and/or separating the process into two steps improve the process as the created partial acylglycerols give rise to more randomly distributed triglycerides when reesterified. It is also believed that the added silica gel helps isomerising the diglycerides and thereby increase the exchange of fatty acids in the sn2 position. The results are given in table 9.

TABLE 8

| Experiment no | 1 | 2 | 3 | 4 | 5 |
|---|---|---|---|---|---|
| Palm oil | 1 | 1 | 1 | 1 | 1 |
| Palmitic acid rich fatty acids - added at start | 3 | 3 | — | 3 | — |
| Immobilized lipase | 0.28 | 0.28 | 0.28 | 0.28 | 0.28 |
| Water | — | 0.08 | — | 0.08 | 0.08 |
| Silica gel (Trisyl 150 IE) | — | — | — | 0.12 | 0.12 |
| Palmitic acid rich fatty acids - added after 4 h | — | — | 3 | — | 3 |

TABLE 9

| | Experiment no | 1 | 2 | 3 | 4 | 5 |
|---|---|---|---|---|---|---|
| 4 h | Diglycerides | 4.4 | 11.8 | 11.5 | 19.8 | 30.7 |
| | Monoglycerides | 0.0 | 0.0 | 0.1 | 0.2 | 1.4 |
| 24 h | C48 | 27.0 | 28.1 | 33.4 | 35.9 | 40.4 |
| | C50 | 52.6 | 51.6 | 47.2 | 45.5 | 42.3 |
| | C52 | 16.2 | 16.6 | 15.3 | 15.0 | 13.2 |

TABLE 9-continued

| Experiment no | 1 | 2 | 3 | 4 | 5 |
|---|---|---|---|---|---|
| C54 | 1.7 | 1.3 | 1.5 | 1.1 | 1.3 |
| Diglycerides | 3.4 | 3.6 | 3.4 | 3.5 | 4.6 |
| Monoglycerides | 0.0 | 0.0 | 0.0 | 0.0 | 0.0 |

The changes in C48 (mainly PPP) was used as a marker of how random the transesterification is.

Example 3

The resulting oil composition of the comparative examples and the product in step 2 of cycle 2 of example 1 were bleached and deodorised. 55% of each of these beta-palmitate fats was blended with 20% rapeseed oil, 15% sunflower oil, and 10% coconut oil to give oil blends according to table 10.

TABLE 10

| | Blend 1 using product according to the invention | Blend 2 using product of the comparative example 1 | Blend 3 using product of the comparative example 2 |
|---|---|---|---|
| C12:0 | 4.7 | 4.6 | 4.8 |
| C14:0 | 1.8 | 1.8 | 1.9 |
| C16:0 | 24.3 | 24.5 | 21.5 |
| C18:0 | 3.7 | 3.2 | 3.3 |
| C18:1 | 43.8 | 44.2 | 46.6 |
| C18:2 | 16.6 | 16.7 | 17.2 |
| C18:3 | 2.0 | 2.0 | 2.0 |
| % of C16:0 in the sn2 position | 43.3 | 42.7 | 43.9 |
| % of C18:0 in the sn2 position | 13.7 | 22.3 | 29.2 |

As can be seen in the table blends 1 and 2 are very similar in fatty acid composition as well as positioning of the palmitic fatty acid but stearic acid is esterified to a lower degree to the sn2 position when using fat according to the invention. When comparing blend 1 and blend 3 it is even more evident that a fat according to the invention gives a lower proportion of stearic acid esterified in the sn2 position than when using alternative beta-palmitate fats.

The invention claimed is:

1. A process for making a final vegetable fat composition with palmitic acid increased in the sn2 position compared to a starting vegetable fat composition, the process comprising the following steps:

a. mixing the starting vegetable fat composition with a first fatty acid mixture to obtain a first process mixture, wherein the starting vegetable fat composition comprises between 15% and 75% by weight of palmitic acid in triglycerides compared to the total weight of fatty acids in triglycerides in the starting vegetable fat composition and the first fatty acid mixture comprises at least 75% by weight of palmitic acid (C16:0) and/or non-glyceride esters thereof compared to the total weight of fatty acids and nonglyceride esters thereof in the first fatty acid mixture;

b. performing a first transesterification process to the first process mixture to obtain a first transesterified mixture comprising a mixture of free fatty acids and/or non-glyceride esters thereof and transesterified triglycerides, wherein palmitic acid content in both the triglycerides and the sn2 position of the triglycerides is increased;

c. separating the free fatty acids and/or non-glyceride esters thereof from the transesterified triglycerides of the first transesterified mixture to obtain an intermediate vegetable fat composition and a first mixture of excess free fatty acids and/or nonglyceride esters thereof;

d. mixing the intermediate vegetable fat composition with a second fatty acid mixture to obtain a second process mixture, wherein the second fatty acid mixture comprises 10% or less by weight of palmitic acid and/or non-glyceride esters thereof compared to the total weight of fatty acids and non-glyceride esters thereof in the second fatty acid mixture;

e. performing a second transesterification process to the second process mixture by use of one or more 1,3-specific lipases to obtain a second transesterified mixture comprising a mixture of free fatty acids and/or non-glyceride esters thereof and transesterified triglycerides;

f. separating the free fatty acids and/or non-glyceride esters thereof from the transesterified triglycerides of the second transesterified mixture to obtain the final vegetable fat composition with palmitic acid increased in the sn2 position compared to the starting vegetable fat composition and a second mixture of excess free fatty acids and/or non-glyceride esters thereof, wherein at least 70% of the amount of palmitic acid in the starting vegetable fat composition is present in the final vegetable fat composition;

g. fractionating the first mixture of excess free fatty acids and/or non-glyceride esters thereof to obtain at least a first palmitic acid rich fraction and a first palmitic acid sparse fraction, wherein the first palmitic acid rich fraction comprises at least 75% by weight of palmitic acid and/or non-glyceride esters thereof compared to the total weight of fatty acids and non-glyceride esters thereof in the first palmitic acid rich fraction and the first palmitic acid sparse fraction preferably comprises 15% or less by weight of palmitic acid and/or non-glyceride esters thereof compared to the total weight of fatty acids and non-glyceride esters thereof in the first palmitic acid sparse fraction;

h. fractionating the second mixture of excess free fatty acids and/or non-glyceride esters thereof to obtain at least a second palmitic acid rich fraction and a second palmitic acid sparse fraction, wherein the second palmitic acid rich fraction comprises at least 75% by weight of palmitic acid and/or non-glyceride esters thereof compared to the total weight of fatty acids and non-glyceride esters thereof in the second palmitic acid rich fraction and the second palmitic acid sparse fraction preferably comprises 15% or less by weight of palmitic acid and/or non-glyceride esters thereof compared to the total weight of fatty acids and non-glyceride esters thereof in the second palmitic acid sparse fraction; and i. using at least the first and second palmitic acid rich fractions as at least a part of the first fatty acid mixture in a subsequent process restarting from step a with a new amount of starting vegetable fat composition.

2. The process according to claim 1, further comprising the step of using the first palmitic acid sparse fraction as at least a part of the second fatty acid mixture in a subsequent process restarting from step a with a new amount of starting vegetable fat composition and/or using the second palmitic acid sparse fraction as at least a part of the second fatty acid mixture in a subsequent process restarting from step a with a new amount of starting vegetable fat composition.

3. The process according to claim 1, wherein the first fatty acid mixture comprises at least 80% by weight of palmitic acid and/or non-glyceride esters thereof compared to the total weight of fatty acids and non-glyceride esters thereof in the first fatty acid mixture.

4. The process according to claim 1, wherein the intermediate vegetable fat composition comprises at least 50% by weight of palmitic acid in the triglycerides compared to the total weight of fatty acids in the triglycerides in the intermediate vegetable fat.

5. The process according to claim 1, wherein the second fatty acid mixture comprises at least 60% by weight of C18 fatty acids and/or non-glyceride esters thereof compared to the total weight of fatty acids and non-glyceride esters thereof in the second fatty acid mixture.

6. The process according to claim 1, wherein the final vegetable fat composition comprises at least 30% by weight of palmitic acid in the triglycerides compared to the total weight of fatty acids in the triglycerides in the final vegetable fat composition.

7. The process according to claim 1, wherein the final vegetable fat composition comprises between 4.0% and 9.0% by weight of stearic acid in the triglycerides compared to the total weight of fatty acids in the triglycerides in the final vegetable fat composition.

8. The process according to claim 1, wherein the process is a continuous process, wherein the continuous process comprises at least the steps a to i, and wherein the process is continued by using at least the first and second palmitic acid rich fractions of step i as at least a part of the first fatty acid mixture in a subsequent process restarting from step a with a new amount of starting vegetable fat composition, wherein the palmitic acid rich fraction as part of the first fatty acid mixture and the new amount of starting vegetable fat composition is processed through step a to i to obtain a subsequent amount of final vegetable fat composition and a subsequent palmitic acid rich fraction, wherein the subsequent palmitic acid rich fraction can then be continued through another subsequent process restarting from step a.

9. The process according to claim 8, wherein the continuous process is performed by transferring back fatty acids that are obtained from one or more of the fractionations and wherein the obtained fatty acids are then used in one or more of the transesterification processes, wherein said transesterification may be performed either batch-wise or continuous.

10. The process according to claim 8, wherein the first fatty acid mixture in the subsequent process restarting from step a is comprising at least 50% by weight of fatty acids and/or non-glyceride esters thereof obtained from fractionating the first and second mixture of excess free fatty acids and/or non-glyceride esters thereof compared to the total weight of fatty acids in the first fatty acid mixture in the subsequent process restarting from step a.

11. The process according to claim 8, wherein the yield of the amount of obtained final vegetable fat composition is at least 50% compared to the amount of starting vegetable fat composition and any fatty acids and/or non-glyceride ester thereof that are not stemming from the steps g and h of a previous cycle.

12. The process according to claim 1, wherein the first palmitic acid sparse fraction comprises 10% or less by weight of palmitic acid and/or non-glyceride esters thereof compared to the total weight of fatty acids and non-glyceride esters thereof in the first palmitic acid sparse fraction.

13. The process according to claim 1, wherein the second palmitic acid sparse fraction comprises 10% or less by weight of palmitic acid and/or non-glyceride esters thereof compared to the total weight of fatty acids and non-glyceride esters thereof in the second palmitic acid sparse fraction.

14. The process according to claim 1, wherein the first fatty acid mixture comprises at least 85% by weight of palmitic acid and/or non-glyceride esters thereof compared to the total weight of fatty acids and non-glyceride esters thereof in the first fatty acid mixture.

15. The process according to claim 1, wherein the intermediate vegetable fat composition comprises at least 60% by weight of palmitic acid in the triglycerides compared to the total weight of fatty acids in the triglycerides in the intermediate vegetable fat.

16. The process according to claim 1, wherein the proportion of palmitic acid in the sn2 position out of total palmitic acid in the triglycerides of the intermediate vegetable fat composition is at least 25%.

17. The process according to claim 1, wherein the second fatty acid mixture comprises at least 70% by weight of C18 fatty acids and/or non-glyceride esters thereof compared to the total weight of fatty acids and non-glyceride esters thereof in the second fatty acid mixture.

18. The process according to claim 1, wherein the final vegetable fat composition comprises at least 35% by weight of palmitic acid in the triglycerides compared to the total weight of fatty acids in the triglycerides in the final vegetable fat composition.

19. The process according to claim 1, wherein the final vegetable fat composition comprises between 4.5% and 8.0% by weight of stearic acid in the triglycerides compared to the total weight of fatty acids in the triglycerides in the final vegetable fat composition.

20. The process according to claim 1, wherein the proportion of stearic acid in the sn2 position out of total stearic acid in the triglycerides of the final vegetable fat composition is between 10% and 30%.

21. The process according to claim 8, wherein the first fatty acid mixture in the subsequent process restarting from step a is comprising at least 70% by weight of fatty acids and/or non-glyceride esters thereof obtained from fractionating the first and second mixture of excess free fatty acids and/or non-glyceride esters thereof compared to the total weight of fatty acids in the first fatty acid mixture in the subsequent process restarting from step a.

22. The process according to claim 8, wherein the yield of the amount of obtained final vegetable fat composition is at least 70% compared to the amount of starting vegetable fat composition and any fatty acids and/or non-glyceride ester thereof that are not stemming from the steps g and h of a previous cycle.

* * * * *